(12) United States Patent
Wen et al.

(10) Patent No.: US 7,584,081 B2
(45) Date of Patent: Sep. 1, 2009

(54) METHOD, SYSTEM AND APPARATUS FOR REAL-TIME RESERVOIR MODEL UPDATING USING ENSEMBLE KALMAN FILTER

(75) Inventors: Xian-Huan Wen, Pleasanton, CA (US); Wen H. Chen, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 544 days.

(21) Appl. No.: 11/285,606

(22) Filed: Nov. 21, 2005

(65) Prior Publication Data

US 2007/0118346 A1 May 24, 2007

(51) Int. Cl.
*G06F 17/10* (2006.01)
(52) U.S. Cl. .......................................... 703/2; 703/10
(58) Field of Classification Search .................. 703/10, 703/2
See application file for complete search history.

(56) References Cited

U.S. PATENT DOCUMENTS

2002/0013687 A1* 1/2002 Ortoleva ...................... 703/10

OTHER PUBLICATIONS

Yaqing Gu et al., "History matching of the PUNQ-S3 reservoir model using the ensemble Kalman filter", Sep. 2004, Society of Petroleum Engineers Annual Technical Conference and Exhibition 2004, SPE 89942, pp. 1-11.*

S. Trivikrama Rao et., "Summertime characteristics of the atmospheric boundary layer and relationships to ozone levels over the Eastern United States", 2003, Pure and Applied Geophysics, pp. 21-55.*
A. Settari et al., "Advances in coupled geomechanical and reservoir modeling with applications to reservoir compaction", 2001, Society of Petroleum Engineers paper 74142, pp. 334-342.*
Geir Naevdal et al., "Reservoir monitoring and continuous model updating using ensemble Kalman filter", Oct. 2003, Society of Petroleum Engineers Annual Technical Conference 2003, SPE 84372, pp. 1-12.*
Richard L. Burden et al., "Numerical Analysis", fourth edition, 1989, PWS-KENT Publishing Company, pp. 384-385, 409-413.*
Geir Evensen, "The Ensemble Kalman Filter: theoretical formulation and practical implementation", 2003, Ocean Dynamics, vol. 53, pp. 343-367.*
Xian-Huan Wen et al., "Real-Time Reservoir Model Updating Using Ensemble Kalman Filter", Jan. 31, 2005, SPE paper 92991, Society of Petroleum Engineers, pp. 1-14.*
Evensen, Geir "Sequential data assimilation with a nonlinear quasi-geostrophic model using Monte Carlo methods to forecast error statistics", Journal of Geophysical Research, vol. 99, No. C5, pp. 10,143-10,162, May 15, 1994.

* cited by examiner

*Primary Examiner*—Paul L Rodriguez
*Assistant Examiner*—Russ Guill
(74) *Attorney, Agent, or Firm*—Christopher D. Northcutt; Richard J. Schulte

(57) ABSTRACT

A method, system and apparatus for real-time reservoir model updating using ensemble Kalman filters is described. The method includes a conforming step for bring bringing static and dynamic state variables into conformance with one another during a time step of the updating. Also, an iterative damping method is used in conjunction with the conformance step to account for nonGaussian and nonlinear features in a system. Also, a re-sampling method is described which reduces the ensemble size of reservoir models which are to be updated.

14 Claims, 22 Drawing Sheets

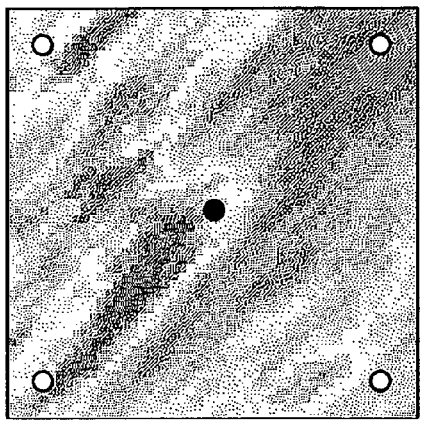
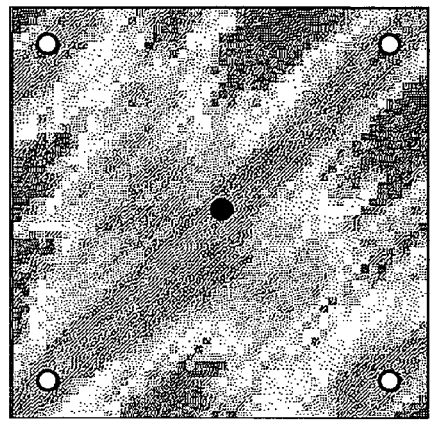
FIG. 8A    FIG. 8B
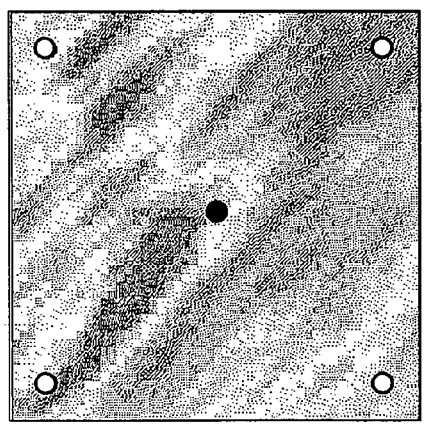
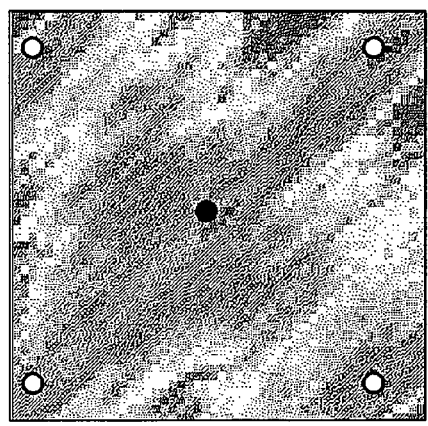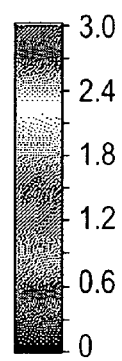
FIG. 8C    FIG. 8D

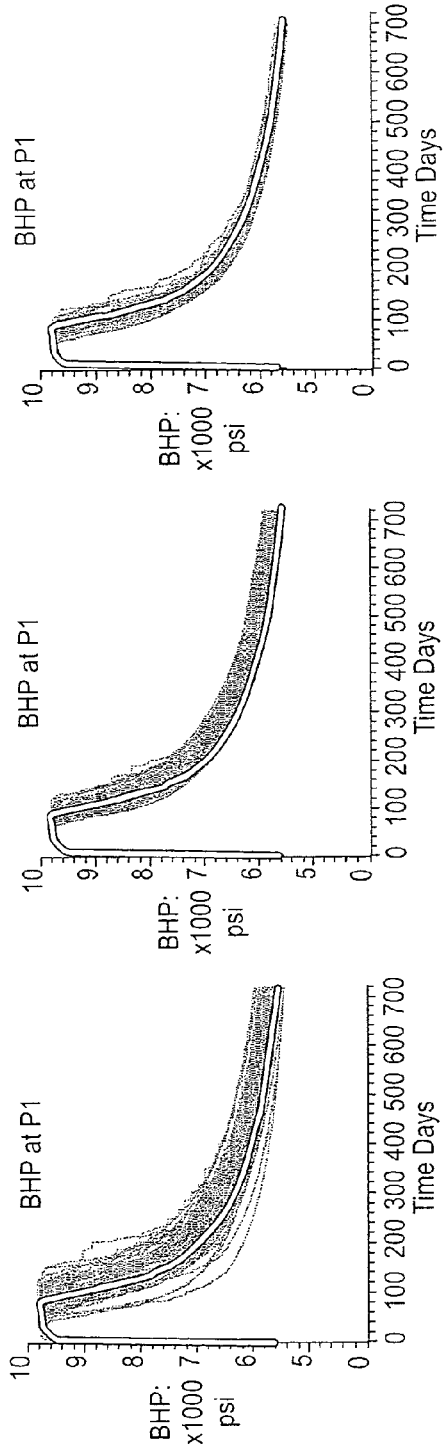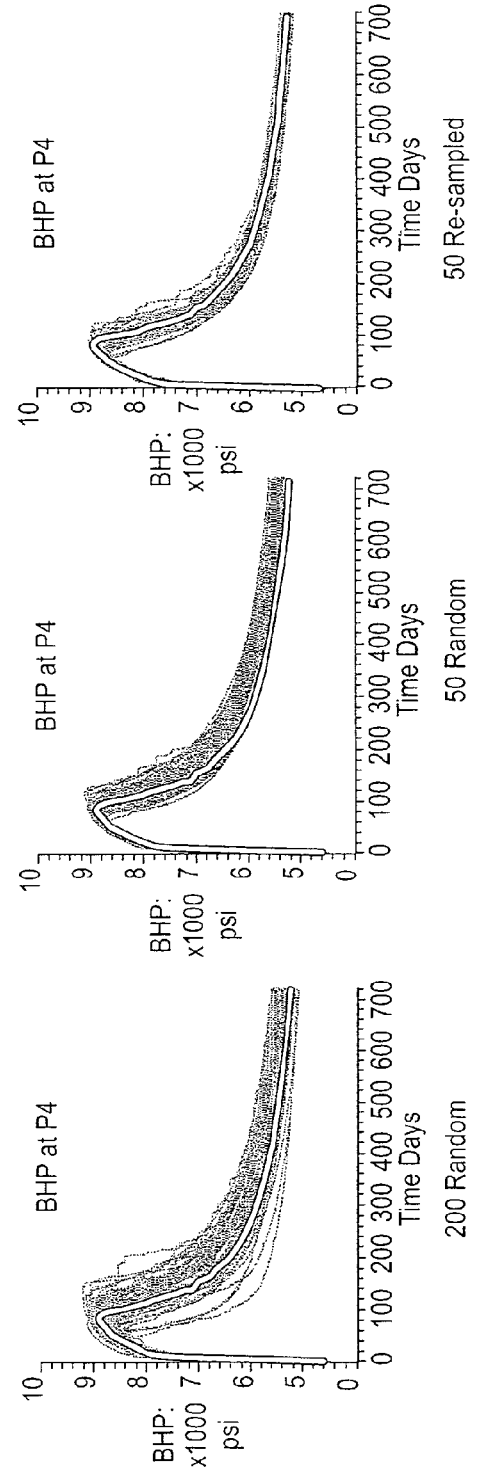

Mean: Delta(t)=30 Days

Variance: Delta(t)=30 Days

Mean: Delta(t)=60 Days

Variance: Delta(t)=60 Days

Mean: Delta(t)=100 Days

Variance: Delta(t)=100 Days

Mean: Delta(t)=300 Days

Variance: Delta(t)=300 Days

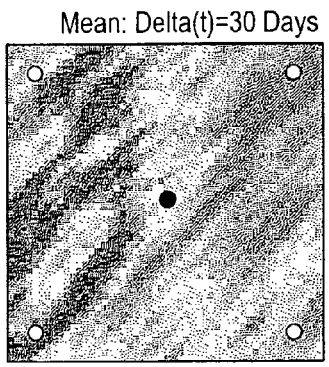
Mean: Delta(t)=30 Days
FIG. 18A
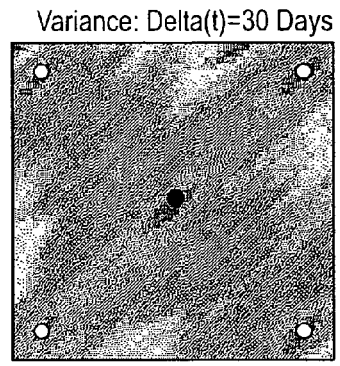
Variance: Delta(t)=30 Days
FIG. 18B
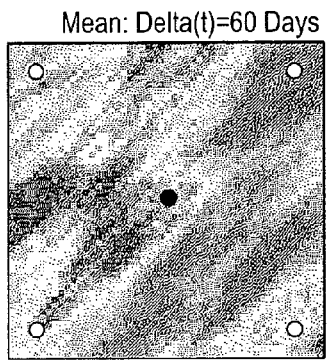
Mean: Delta(t)=60 Days
FIG. 18C
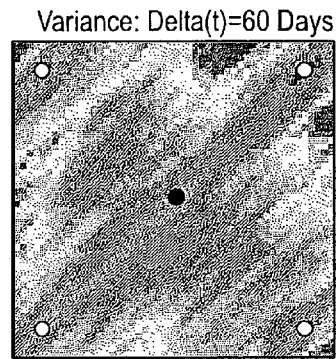
Variance: Delta(t)=60 Days
FIG. 18D
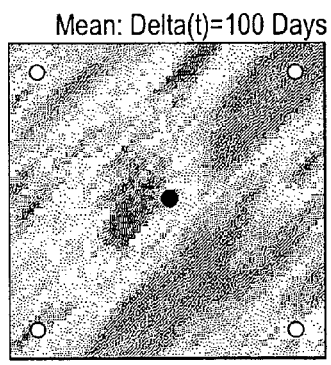
Mean: Delta(t)=100 Days
FIG. 18E
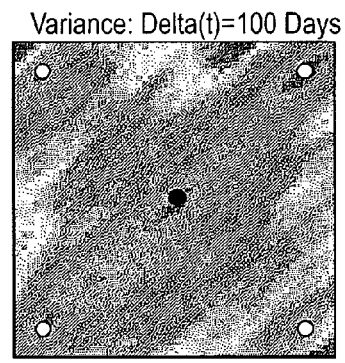
Variance: Delta(t)=100 Days
FIG. 18F
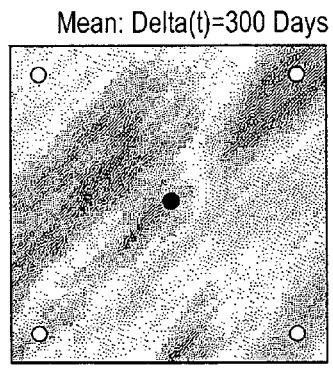
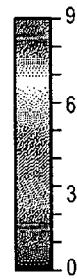
Mean: Delta(t)=300 Days
FIG. 18G
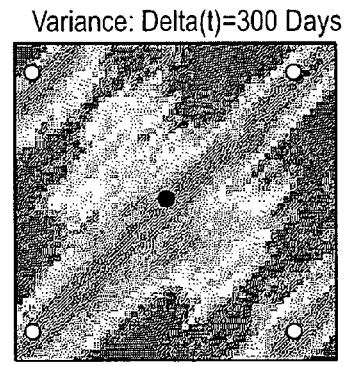
Variance: Delta(t)=300 Days
FIG. 18H

METHOD, SYSTEM AND APPARATUS FOR REAL-TIME RESERVOIR MODEL UPDATING USING ENSEMBLE KALMAN FILTER

TECHNICAL FIELD

The present invention relates generally to reservoir simulators for predicting the flow of fluids through subterranean formations, and more particularly, to methods of updating reservoir simulator models to be consistent with actual measured production data utilizing ensemble Kalman filters (EnKF).

BACKGROUND OF THE INVENTION

Reservoir models have become an important part of day-to-day decision analysis related to management of oil/gas fields. The concept of 'closed-loop' reservoir management is currently receiving considerable attention in the petroleum industry. A 'real-time' or 'continuous' reservoir model updating technique is an important component for the feasible application of any closed-loop reservoir management process. This technique should be able to rapidly and continuously update reservoir models assimilating the up-to-date measured production data so that the performance predictions and the associated uncertainty are up-to-date for optimization calculations.

The closed-loop reservoir management concept allows real-time decisions to be made that maximize the production potential of a reservoir. These decisions are based on the most current information available about the reservoir model and the associated uncertainty of the information. One important requirement in this real-time, model-based reservoir management process is the ability to rapidly estimate the reservoir models and the associated uncertainty reflecting the most current production data in a real-time fashion.

Traditionally, validation of reservoir models as compared to production data is accomplished through a history matching (HM) process. Conventional history matching methods suffer from one or more of the following drawbacks:

(1) production data for the entire history are matched at the same time and repeated flow simulations of the entire history are required which makes HM extremely time consuming;

(2) gradient based HM methods require sensitivity coefficient calculations and minimization which are complicated, CPU intensive, and often trapped by local minima; and (3) it is difficult to assess uncertainty with traditional methods and may involve repeating the history matching process with different initial models (this is rarely done because of the time involved to achieve a single history match).

Thus, despite significant progress made academically and practically, the traditional history matching methods are not well suited for real-time model updating. This is particularly true when a large amount of data are available (e.g., from permanent sensors) and rapid updating of multiple models is required.

The ensemble Kalman filter (EnKF) updating method is well suited for such applications compared to the traditional history matching methods. The unique features of the ensemble Kalman filter are summarized below:

(1) EnKF incrementally updates reservoir models assimilating production data sequentially with time as they become available, thus it is ideally suited for real-time applications;

(2) an ensemble of reservoir models that reflect the most current production data are always maintained. Thus, the performance predictions and uncertainty are always available for optimization study;

(3) EnKF is computationally fast because of the efficiency of parallel/distributing computing;

(4) EnKF can be applied with any reservoir simulator without the need of complicated coding; and (5) EnKF does not need optimization and sensitivity coefficients calculations.

These features make EnKF ideal for real-time reservoir model updating. Since its introduction, EnKF has been widely used in Meteorology and Oceanography for data assimilation in large non-linear systems. Evensen, G.: "Sequential data assimilation with a nonlinear quasi-geostrophic model using Monte-Carlo methods to forecast error statistics," *Monthly Weather Review*, 127(12), 2741-2758, 1999.

Houtekamer, P. L. and Mitchell, H. L.: "Data assimilation using an ensemble Kalman filter technique," *Monthly Weather Review*, 126(3), 796-811, 1998.

Van Leeuwen, P. J. and Evensen, G.: "Data assimilation and inverse methods in terms of probabilities formulation", *Monthly Weather Review* 124, 2898-2913, 1996.

Reichle, R. H., McLaughlin, D. B., and Entekhabi, D.: "Hydrologic data assimilation with the ensemble Kalman filter," *Monthly Weather Review*, 130(1) 103-114, 2002.

Burgers, G., van Leeuwen, P. J. and Evensen, G.: "Analysis scheme in the ensemble Kalman filter," *Monthly Weather Review*, 126, 1719-1724, 1998. Evensen, G.: "The ensemble Kalman filter: Theoretical formulation and practical implementation," *Ocean Dynamics*, 53(4), 343-367, 2003.

The ensemble Kalman filter has recently been introduced into the Petroleum industry. Gu, Y. and Oliver, D. S.: "The ensemble Kalman filter for continuous updating of reservoir simulation models," Computational Geosciences, in press, 2005; Naevdal, G., Mannseth, T., and Vefring, E. H.: "Near-well reservoir monitoring through ensemble Kalman filter," Paper SPE 75235 presented at the SPE/DOE Improved Oil Recovery Symposium, 13-18 Apr. 2002; and Naevdal, G., Johnsen, L. M., Aanonsen, S. I., and Vefring, E. H.: "Reservoir monitoring and continuous model updating using ensemble Kalman filter", Paper SPE 84372, presented at the 2003 SPE Annual Technical Conference and Exhibition, Denver, Colo., 5-8 Oct. 2003.

The ensemble Kalman filter can also be used as a history matching technique. Gu, Y. and Oliver, D. S.: "History matching of the PUNQ-S3 reservoir model using the ensemble Kalman filter," Paper SPE 89942 presented at the 2004 SPE Annual Technical Conference and Exhibition, Houston, Tex., 26-29 Sep. 2004; Liu, N. and Oliver, D. S.: "Critical evaluation of the ensemble Kalman filter on history matching of geological facies," Paper SPE 92867 presented at the 2005 SPE Reservoir Simulation Symposium, Houston, Tex., 31 January—2 Feb., 2005; Lorentzen, R. J., Naevdal, G., Valles, B., Berg, A. M. and Grimstad, A. A.: "Analysis of the ensemble Kalman filter for estimation of permeability and porosity in reservoir models", SPE 96375 presented at the 2005 SPE Annual Technical Conference and Exhibition held in Dallas, Tex., 9-12 Oct. 2005; and Tarantola, H.: Inverse Problem Theory: Methods for Data Fitting and Model Parameter Estimation. Elsevier, Amsterdam, Netherlands, pp. 613, 1987.

However, current EnKF methodologies have a number of shortcomings. First, conventional EnKF fails to resolve flow equations after Kalman filter updating so that the updated static and dynamic variables may not be consistent, i.e., solutions of the flow equations based on the updated static variables may be different from the updated dynamic variables. Second, the conventional EnKF methods fails to account for nonlinearity and other assumptions made during Kalman updating. Further, conventional EnKF typically require large ensemble sizes to ensure accuracy. The present invention addresses these shortcomings in conventional EnKF methods.

SUMMARY OF THE INVENTION

The present invention provides a method, system and apparatus for real time reservoir model updating using an ensemble Kalman filter. The method comprises the following steps. An ensemble of reservoir models is generated. The ensemble is represented, at a first time step, by an initial state vector of static and dynamic state variables. For example, the static state variables may include porosity and/or permeability. The dynamic state variables may include pressure and saturation. From a first time step to a second time step, the initial state vector is forecasted forward to compute a forecasted state vector which includes forecast static and dynamic variables and forecast production data. A gain, preferably a Kalman gain, is computed based upon forecast state variables and the forecast production data. An updated state vector of updated static and dynamic state variables is then computed utilizing the computed gain, as well as the observed production data and the forecast production data. Next, a conforming state vector is created including the updated static state variables and the dynamic state variables. Finally, from the first time step to the second time step, the conforming state vector is forecasted forward to compute a forecasted conforming state vector which includes forecast static and dynamic state variables. Accordingly, the ensemble of reservoir models is updated with the static and dynamic state variables of the forecasted conforming state vector being in conformance with one another. Also, an iterative damping method may be used in conjunction with the conformance step to account for nonlinearity in a general inverse problem through an outer iteration with a damping updating. Further, a method is provided which reduces the ensemble size of reservoir models which are to be updated.

It is an object of the present invention to provide a method of conforming static and dynamic variables of reservoir models during the use of an ensemble Kalman filtering updating method.

It is another object to provide an ensemble Kalman filtering method in which iterations are used to correct Gaussian and linear assumptions in a system.

It is yet another object to provide a sampling technique for selecting a subset of ensembles from a large size of ensembles which ensures accuracy while reducing the number of ensembles needed to accurately perform EnKF.

BRIEF DESCRIPTION OF THE DRAWINGS

FIGS. 8(A)-(D) show mean and variance of 200 permeability models updated at 60 and 120 days using the iterative EnKF updating process;

FIGS. 15(A)-(F) show graphs of simulated production data for the entire history using the updated models at the last time step (720 days) with different initial ensemble sets; The white lines are the true results;

FIGS. 18(A)-(H) show the mean and variance of 200 permeability models updated at 300 days with different assimilation time intervals $\Delta_t$ using the iterative EnKF;

DETAILED DESCRIPTION OF THE INVENTION

Figure 1:
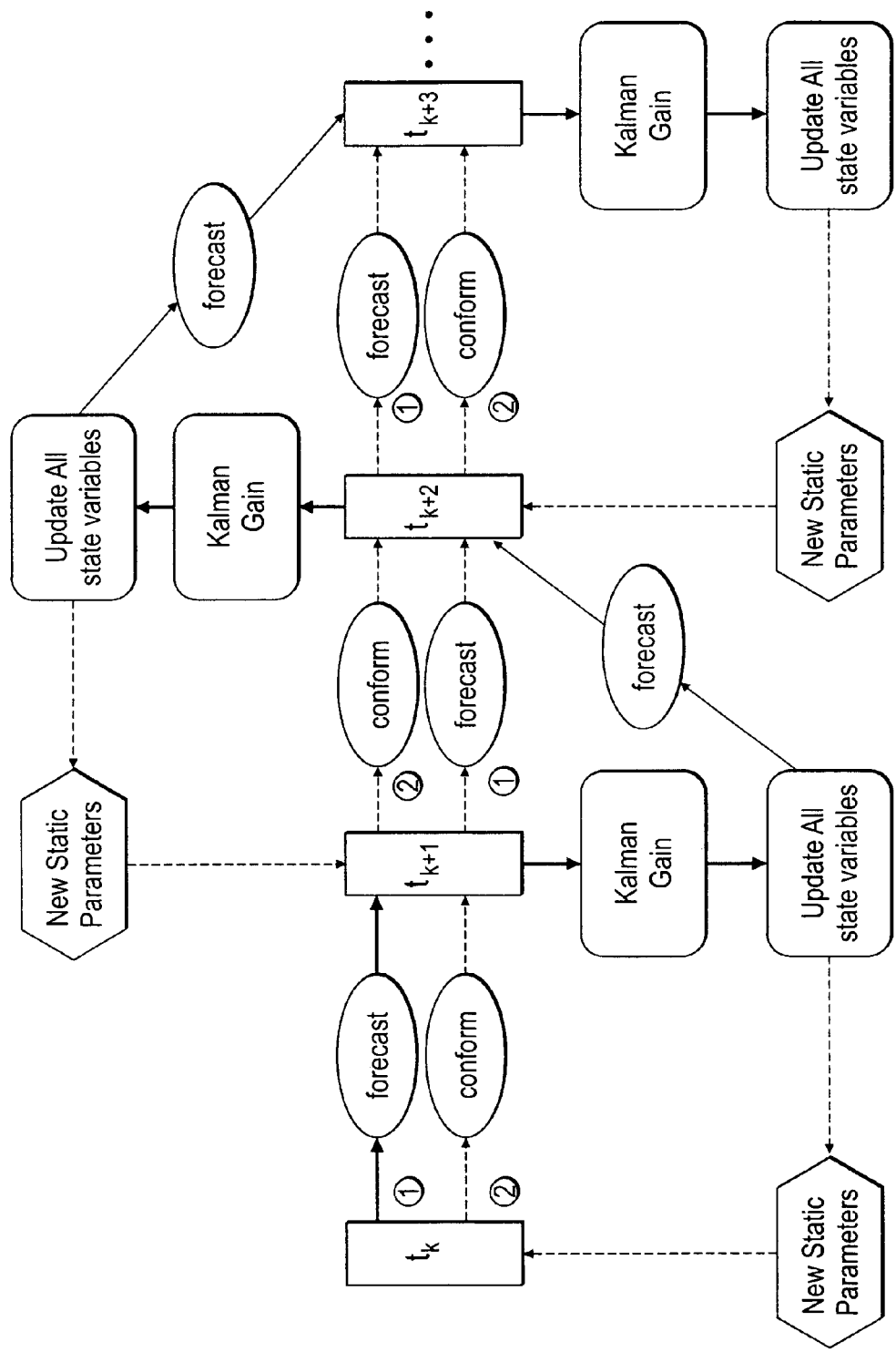
FIG. 1 is a schematic drawing of a non-iterative ensemble Kalman filter (EnKF) procedure (follow the solid arrows) and a conforming EnKF process (follow the thick arrows and dashed arrows (1) then (2)

Conventional EnKF methodology will first be described. This methodology corresponds to the path shown by solid arrows in FIG. 1. Then, a method is described which brings static and dynamic parameters into conformance. This method employs conformance steps which are incorporated into the conventional EnKF methodology. The added conformance steps are shown by dashed arrows in FIG. 1. Next, an iteration process in the EnKF updating methodology is introduced which addresses possible non-Gaussian and non-linear features in the reservoir system. See FIG. 2. A resampling method is then described which reduces the ensemble size of reservoir models which are to be updated. The sensitivity of using different assimilation time intervals is also investigated. An exemplary EnKF methodology, practiced in accordance with the present invention, is then used in conjunction with a synthetic 2D example to show the advantages to be gained using aspects of the present invention.

Ensemble Kalman Filter Updating

EnKF updating is a Bayesian approach and is initialized by generating an ensemble of initial reservoir models using a priori geostatistical assumptions. Production data are incorporated sequentially in time and the reservoir models are updated as new production data are introduced. EnKF updating consists of three processes at each time step: (1) forecasting based on current state variables (i.e., solving flow equations with current static and dynamic variables), (2) data assimilation (computation of Kalman gain), and (3) updating of state variables. The evolution of dynamic variables is dictated by the flow equations.

State variables include three types of variables: static variables (e.g., permeability and porosity fields that are traditionally called static because they do not vary with time. However, in the EnKF approach, static variables are updated with time and thus are changing with time representing the absorbing of new information from the data. This "static" notion is used for the convenience of traditional concepts), dynamic variables (e.g., pressure and phase saturations of the entire model that are solutions of the flow equations), and production data (e.g., well production rate, bottom-hole pressure, phase production/injection rate, water cut, etc. that are usually measured at wells). The ensemble of state variables is modeled by multiple realizations such that $$y_{k,j} = \begin{bmatrix} m_s \\ m_d \\ d \end{bmatrix}_{k,j} \quad (1)$$

where $y_{k,j}$ is the $j^{th}$ ensemble member of the state vector at time $t_k$. $m_s$ and $m_d$ are static and dynamic variable vectors, and d is the production data vector. In a preferred and exemplary embodiment, $m_s$ is the permeability at each cell of the reservoir model with dimension of N being the total number of active cells, $m_d$ includes pressure and water saturation (two-phase model) at each cell (with dimension of 2N), and d includes bottom-hole pressure, oil production rate and water production rate at wells with dimension of $N_{d,k}$. The dimension of the state vector is $N_{y,k}$ which can change with time $t_k$ to account for different amounts of production data at different times. Nomenclature associated with equations used in the present description can be found at the end of this specification. Those skilled in the art will appreciate that other static, dynamic and production variables and data, other than aforementioned variables and data, may also be used with and are within the scope of the present invention.

The step-by-step process of a traditional EnKF is described as follows (see FIG. 1, following the solid arrows):

The filter is initialized by generating initial ensembles of static and dynamic vectors. There are no production data available at the starting time ($t_k$). There are a variety of methods that can be used to generate an initial ensemble. In this exemplary embodiment, a geostatistical method, such as Sequential Gaussian Simulation, is used to generate multiple (200) realizations of the permeability field with given statistical parameters (histogram and variogram) to represent the initial uncertainty in the permeability model before any production data are available. Initial dynamic variables (i.e., initial pressure and saturations) are assumed known without uncertainty. Thus, the dynamic variables are the same for each realization. If, however, initial variables are also uncertain, they should be represented by ensembles. Sequential Gaussian Simulation is further described in Deutsch, C. V. and Journel, A. G.: GSLIB: Geostatistical Software Library and User's Guide. $2^{nd}$ edition, Oxford University Press, New York, pp. 369, 1998.

The forecast step calls for a reservoir simulator to perform forward simulation for each of the realizations until the next point in time where new measurements of production data are available and are to be assimilated (e.g., $t_{k+1}$). The state variable vector after running the forecasting is denoted by $y_{k=t_{rj}}^{f}$ (note the values of static variables $m_s$ at the initial and forecast steps are the same). Forecasting creates the ensemble of new dynamic and production data at the given time consistent with the initial static variables. The Kalman gain may then be computed as:

$$G_k = C_{y,k}^f H_k^T (H_k C_{y,k}^f H_k^T + C_{d,k})^{-1} \quad (2)$$

where $G_k$ is the Kalman gain for time $t_k$. $H_k$ is a matrix operator that relates the state vector to the production data. Because the production data are part of the state vector as in Eq. (1), $H_k$ is in the form of $H_k = [0|I]$, where 0 is a $N_{d,k} \times (N_{y,k} - N_{d,k})$ matrix with all zeros as its entries; I is a $N_{d,k} \times N_{d,k}$ identity matrix. The superscript f denotes forecast, meaning that the values are output from the simulator before Kalman filter updating. $C_{d,k}$ is the covariance matrix of production data error with dimension of $N_{d,k} \times N_{d,k}$ and is diagonal since it is assumed that the production data errors are independent. $C_{y,k}^f$ is the covariance matrix for the state variables at time tk that could be estimated from the ensemble of forecasted results ($y_{k,j}^f$) using a standard statistical method. By way of example, and not limitation, one such statistical methods is provided by:

$$C_{y,k}^f = \frac{1}{N_e - 1}(Y_k^f - \overline{Y}_k^f)(Y_k^f - \overline{Y}_k^f)^T \qquad (3)$$

where $y_k^f$ is the ensemble of forecasted state vector at time tk with dimension of $N_{y,k} \times N_e$ ($N_e$ is the number of realizations in the ensemble). $\overline{Y}_k^f$ is the mean of the state variables which is a vector with dimension of $N_{y,k}$. Those skilled in the art will appreciate that other statistical methods could also be used and are within the scope of this invention.

With $G_k$ and production data at the assimilating time step ($d_k$), the state variable vector is then updated as:

$$y_{k,j}^u = y_{k,j}^f + G_k(d_{k,j} - H_k y_{k,j}^f) \qquad (4)$$

Note that random perturbations are added to the observed production data ($d_k$) to create an ensemble of production data set with $d_{k,j}$ being the $j^{th}$ ensemble member. Burgers, G., van Leeuwen, P. J. and Evensen, G.: "Analysis scheme in the ensemble Kalman filter," Monthly Weather Review, 126, 1719-1724, 1998, showed that the variability among the updated ensemble members is too small if no random noise is added to the production data. Eq. (4) has apparent physical meaning: the second part of the second term on the right hand side is the difference of simulated and observed production data; the larger this difference, the larger will be the update applied to the initial state vector. If the simulated production data at a given realization is equal to the observed data, no update will need to be made to this model. The covariance matrix after updating can be computed as:

$$C_{y,k}^u = (I - G_k H_k) C_{y,k}^f \qquad (5)$$

With this updating, the state vector of each realization in the ensemble is considered to reflect the most current production data ($d_k$) and the next time step can be reached where new production data are available for assimilation. The state variables are advanced in time as:

$$y_{k,j}^f = F(y_{k-1,j}^u), j = 1, 2, \ldots N_e \qquad (6)$$

where F is the reservoir simulator. From Eqs. (4) and (5), it can be seen that the updating of the ensemble is linear and there is an underlying assumption that the model error and production data error are independent. Also, both model and production data errors are uncorrelated in time.

Figure 2:
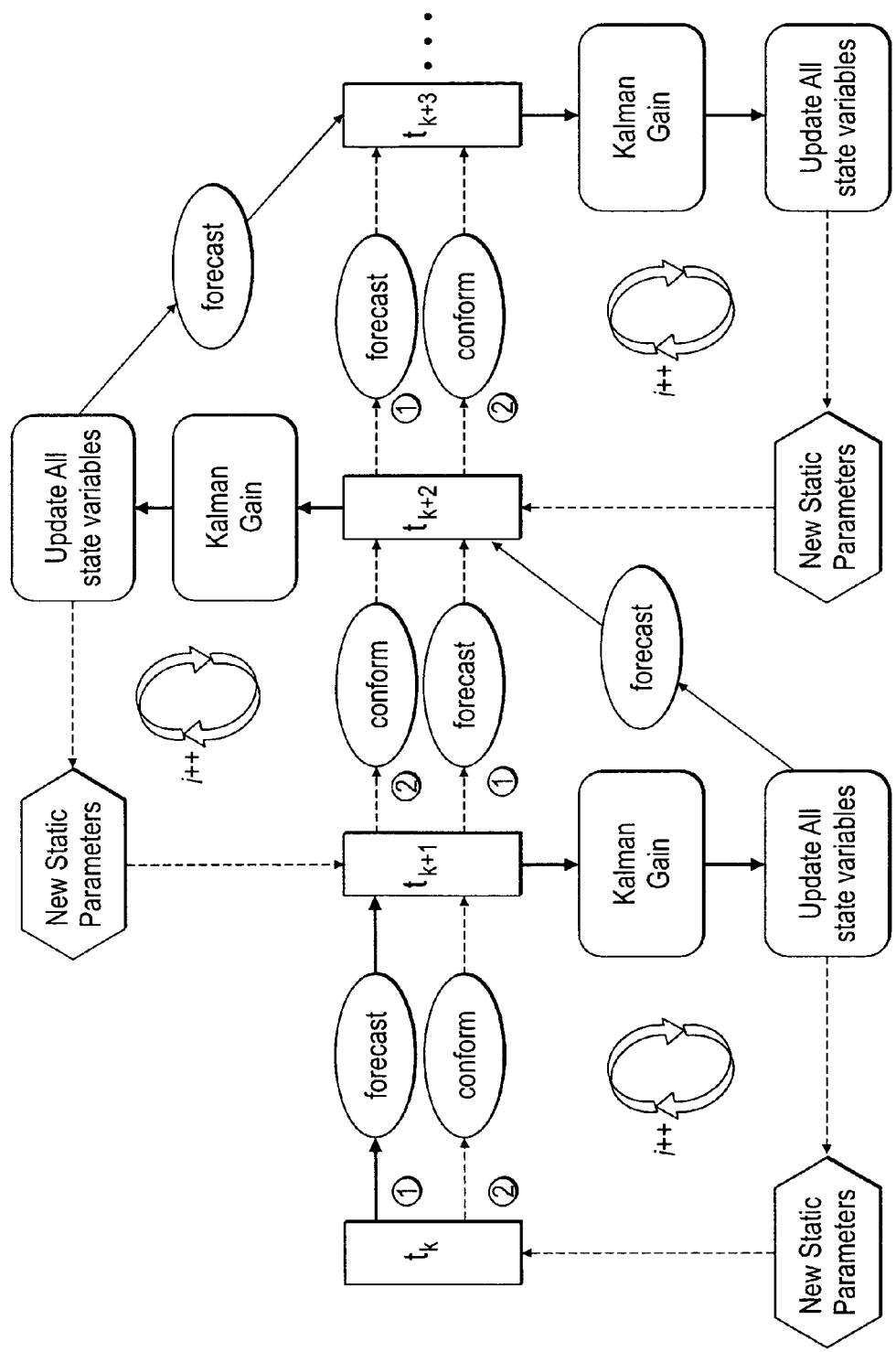
FIG. 2 is a schematic drawing of an interative EnKF process (follow the conforming EnKF process) with iterations performed during updating steps.

The overall work-flow of EnKF is shown in FIG. 1 following the solid arrows. The production data are incorporated into reservoir models sequentially in time as they become available and the ensemble of reservoir models are evolving with time representing the assimilation of measurements at the given time. When new measurements of production data are acquired, it is simple to forward simulate the flow using the most current state vector to the time at which new production data are collected and perform the above analysis to update the state vector in order to reflect the new data. Each assimilation represents some degree of increment of quality to the estimation of reservoir model. The degree of this increment depends on how much information the new measured data is carrying. Thus, there is no need to start the process all over again from the original starting time in order to incorporate the new acquired data, whereas, in traditional history matching, static variables are treated as static (not varying with time) and all production data are matched simultaneously using one set of static variables. When there are new measurements needed to be matched, the entire history matching has to be repeated using all data. The advantage of using EnKF is obvious, especially, when the frequency of data is fairly high as, for example, the data from permanent sensors.

The EnKF can be built upon any reservoir simulator because it only requires the outputs of the simulator. The simulator acts as a black box in the process of EnKF. Thus the coding of the EnKF method is significantly simpler than traditional gradient-based history matching methods where complicated coding of sensitivity calculations is required for different simulators and access to the source code of the simulator is needed. Another advantage of EnKF is that it provides an ensemble of $N_e$ reservoir models all of which assimilate up-to-date production data with the computer time of approximately $N_e$ flow simulations (the CPU time for data assimilation is very small compared to the flow simulation). This is well-suited for uncertainty analysis when multiple reservoir models are needed. With traditional history matching, however, there is a need to repeat the CPU intensive history matching process with different initial models to create multiple models. Furthermore, EnKF is well-suited for parallel/distributing computation since the time evolution of ensemble reservoir models are completely independent.

The traditional EnKF has a potential problem: the updated dynamic variables md (e.g., pressure and saturations) using Eq. (4) may not be physically meaningful and may be inconsistent with the updated static variables $m_s$ (e.g., permeability) of the same time. By "inconsistent" it is meant that the solutions of the flow equations using a reservoir simulator based on the updated static variables are different from the dynamic variables updated by the filter. This is due to the fact that Kalman updating is linear, whereas the flow equations are non-linear. In one aspect of the present invention, an additional step is added to the EnKF which shall be referred to as a "conforming step", to ensure that the updated dynamic and static variables are consistent.

The EnKF updating method utilizing the "conforming step" is illustrated in FIG. I with the conforming step shown in dashed arrows. This method may be carried out as follows:

(a) starting at time $t_k$, the current state vector $y_{k,j}$ (with static and dynamic variables $m_s$ and $m_d$) are used to forecast (forward simulate) a forecasted state vector $y_{k,j}^f$ at a next time $t_{k+1}$ which includes static and forecasted dynamic variables $m_s$, $m_d^f$ and a production forecast vector $d^f$; note that the static variable $m_s$ of the forecasted state vector $y_{k,j}^f$ remains unchanged from time $t_k$ while dynamic variables $m_d^f$ is changed due to the forecasting computation;

(b) a gain based upon the measured or observed data d and the forecasted production data $d^f$, most preferably a Kalman gain $G_k$, is then computed utilizing the forecasted state vector $y_{k,j}^f$. Ideally, the Kalman gain is calculated using Eq. (2);

(c) the gain is then used to create an updated state vector $y_{k,j}^u$ including state variables $m_s^u$ and $m_d^u$; preferably, this updating of the forecasted state vector $y_{k,j}^f$ utilizes Eq (4);

(d) the static variables $m_s^u$ from step (c) are then used to update, i.e., replace, the static variables $m_s$ in the original state vector $y_{k,j}$ to create an updated state vector $y_{k,j}$ including the updated static variables $m_s^u$ and the original dynamic variables $m_d$; and (e) a conforming forecast is performed, utilizing the updated state vector $y_{k,j}$ at time $t_k$, to produce conformed state vector $y_{k,j}^e$ at time $t_{k+1}$.

This conformed state vector $y_{k,j}^e$ at time $t_{k+1}$ is then used for the start of the next assimilation step. By adding this conforming step to a conventional ensemble Kalman updating methodology, it is ensured that the updated static and dynamic variables are consistent with the flow equations. The cost is a doubling of the CPU time compared to the non-conforming traditional EnKF. However, such a conforming step is often desirable and improved results are obtained, particularly for the time when there are significant variations in the production data, e.g., when new wells are added or shut-in.

The updated state vector using Eq. (4) is the best linear unbiased estimate (the least variance estimation). Thus, it is a linear update. The underlying assumption of such updating is that the state vector errors and observation errors are unbiased and are not correlated. Also, the updated state vector ($y_{k,j}^u$) can be expressed as a linear combination of initial state vector ($y_{k,j}^f$) and observation vector ($d_k$) that minimizes posterior variance. An inherent assumption in all Kalman filters is that the errors in the analysis step are Gaussian. In practice, however, the flow equations and measured data may not satisfy such assumptions.

In another aspect of the present invention, an approach is introduced to account for nonlinearity in a general inverse problem through an outer iteration with a damping updating. This outer iteration process is introduced within the EnKF updating step in order to reduce the effects of possible incorrect assumptions (see FIG. 2). The updating at each iteration is as follows:

(a) starting from current time $t_k$, forecast (forward simulate) to the next time ($t_{k+1}$) using the current state vector;
(b) computing Kalman gain based on the resulting forecasting results (i.e., using Eq. (2));
(c) updating only the static parameter (i.e., using a formula similar to Eq. (4)), but with a damping factor included;

$$y_{k,j}^{u,i+1} = y_{k,j}^{u,i} + \alpha_k^i G_k^i (d_{k,j}^i - H_k y_{k,j}^{f,i}) \quad (7)$$

where
$\alpha_k^i$ is the damping parameter at time $t_k$ at iteration i with value between 0 and 1;
$y_{k,j}^{u,i+1}$=updated state vector at time $t_k$ at iteration i+1;
$y_{k,j}^{u,i}$=updated state vector at time $t_k$ at iteration i;
$G_k^i$=the Kalman gain at the ith iteration;
$d_{k,j}^i$=observed production data at time $t_k$ at the ith iteration;
$H_k$=Matrix operator that relates state vector to production data in state vector at time $t_k$; and
$y_{k,j}^{f,i}$=forecasted state vector at time $t_k$ at the ith iteration.
(d) taking the newly updated static parameters ms (i.e., permeability and porosity) and run the flow simulation from the current (i.e., $t_k$) to the next time ($t_{k+1}$) again;
(e) computing an objective function (mean and variance of all members) which is preferably the normalized squared-root difference between the observed and simulated production data; and
(f) if the mean and variance of the objective function is not smaller than the pre-set values, loop back to step a). Otherwise, if the mean and variance of objective function are small enough, or when the reduction of objective function is too small, proceed to the next assimilation step. The newly updated static parameter and the conformed dynamic variables are used as the starting/initial state vector for the next assimilation step.

The damping parameter "$\alpha_k^i$" is most preferably selected by a trial and error method for different problems. By way of example, and not limitation, this damping parameter may also be chosen as 0.5 as a starting value. Those skilled in the art will appreciate that other means of selecting the damping parameter may also be selected and are within the scope the present invention.

The updated static variables are used to re-compute the updated dynamic variables and production data, from which an objective function is computed. The objective function represents the difference between the observed and simulated production data. As one example, the objective function is computed as the normalized squared-root mean difference between the observed and simulated data. The iteration is continued until the objective function is small enough, i.e., within predetermined criteria, or when the reduction of objective function is too small. Typically, these criteria may be established by e.g., 10% of the value of objective function at the initial step or the previous step.

This iterative updating process will be tested and is described below using an example to illustrate its impact on the results. This iteration enhancement is needed only when significant flow behavior changes occur, such as at the early production time or when new wells are added or shut in. For most of the other assimilation times, additional iterations are not necessary. The criterion for whether or not to use these iterations at each assimilation time can be set and automatically applied during the assimilation process. Furthermore, for the cases when the distance between the simulated and measured values is large, the traditional EnKF updating may cause problems because of the linear assumption. Using additional iterations may reduce the nonlinear effects and thus reduce filter divergence. Filter divergence refers to a process wherein the updated static variables deviate from the true or previously updated stable values significantly.

EnKF is a Monte-Carlo method which relies on the use of a large ensemble set to compute the required statistics, as well as the derived uncertainty. The computational efficiency of EnKF is thus heavily dependent on the size of ensemble used in the calculation. Too small ensemble size results in large sampling error for computing the covariance functions needed for the EnKF updating, and may cause filter divergence. Studies have shown that a relative large ensemble size is needed for reliable assess of prediction uncertainty. One approach to improve the efficiency of EnKF is to improve the initial member sampling so that a smaller number of members can provide as large an uncertainty space span as possible resulting in more stable filter updating.

Methods for sampling a given random variable for efficient uncertainty propagation calculation are available, such as the polynomial chaos expansion or probabilistic collocation method. Xiu, D., Karniadaskis, G. E.: "Modeling uncertainty in flow simulations via generalized polynomial chaos", Journal of Computational Physics, 187, 137-167, 2003. Application of such methods for optimal encapsulation of information contained in an input random field and output random flow variables have been evaluated. Sarma, P., Durlofsky, L. J., Aziz, K., and Chen, W. H.: "Efficient real-time reservoir management using adjoint-based optimal control and model updating", submitted to Computational Geosciences, 2005. Such methods require the random variables to be independent, thus a methodology of representing a spatial correlated random function by a series of independent random variables is required, e.g., a Karhunen-Loeve (L-K) expansion. Reynolds, A. C., He, N. Chu, L., and Oliver, D. S.: "Reparameterization techniques for generating reservoir descriptions conditioned to variogram and well-test pressure data", SPE Journal, 1, 413-426, 1995. This type of operation is usually computationally slow for a large system because it calls for eigenvalue and eigenvector calculation.

Evensen, G.: "Sampling strategies and square root analysis schemes for the EnKF", Ocean Dynamics 54, 539-560, 2004, proposed an algorithm to re-sample a smaller number of members from the original larger ensemble set, so that the sample statistics introduced by the original large ensemble set are kept. It has been shown that this method can provide a larger uncertainty space than that from the same number of ensemble members by random-sampling from the prior pdf and can ensure a stable filter behavior. Dong, Y., Gu, Y. and Oliver, D. S.: "Quantitative use of 4D seismic data for reservoir description: the ensemble Kalman filter approach", submitted to Journal of Petroleum Science & Engineering, 2005. This method, however, requires the Singular Value Decomposition (SVD) which is computationally intensive for large systems. Also the re-sampling objective is for the reproduction of the statistics provided by the larger initial ensemble members. Thus it does not account for the uncertainty space of production data.

Figure 3:
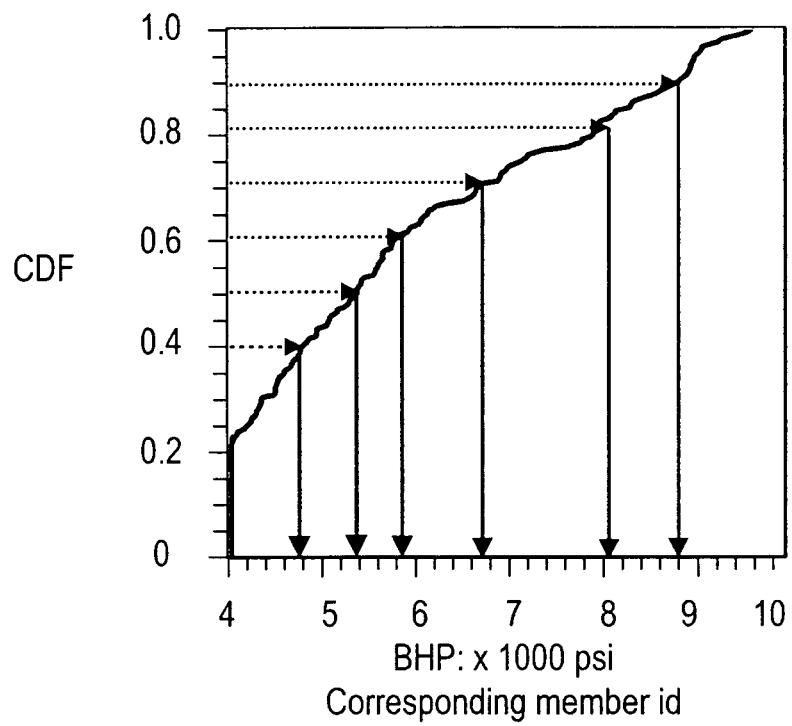
FIG. 3 is a graph of a cumulative distribution function (cdf) of bottom hole pressure (BHP) and the sampling of model member uniformly from the cdf.

A re-sampling approach ideally should also account for the uncertainty space spanned by the production predictions. With this objective in mind, a simple re-sampling scheme may be used which is based on the ranking of the large original ensemble set. The model ranking is based on the most varying production variable. The following steps may be used:

(1) at initial time $t_k$, generate a large ensemble set with size of $N_T$;
(2) forward simulate each model to the first assimilation time ($t_{k+1}$);
(3) find the most varying production data by computing e.g., the coefficient of variation of each production data;
(4) rank the $N_T$ model based on the most varying production data and draw a cumulative distribution function (cdf) curve based on the ranking of each model (see FIG. 3);
(5) sample a smaller number of realizations ($N_e$) uniformly from the cdf curve to obtain the corresponding model (see FIG. 3); and
(6) use the smaller ensemble size ($N_e$) for the proceeding assimilation steps.

This approach is simple and easy to implement within any EnKF. By doing so, some of the initial models that are too close to each other in terms of their production responses are essentially eliminated. Also, production data are directly used for the selection of the initial models. The cost of such process is $N_T$-$N_e$ flow simulations from time $t_k$ to $t_{k+1}$. A drawback is that the sampling is based on one production data at the first assimilation time and thus may be insufficient to accurately represent the uncertainty space for the entire model. More sophisticated ranking methods may be used to improve the efficiency of this approach. By way of example, and not limitation, these ranking methods might include e.g., simplified physics flow simulations or simulation on a coarser model grid.

EXAMPLES

Figure 4A:
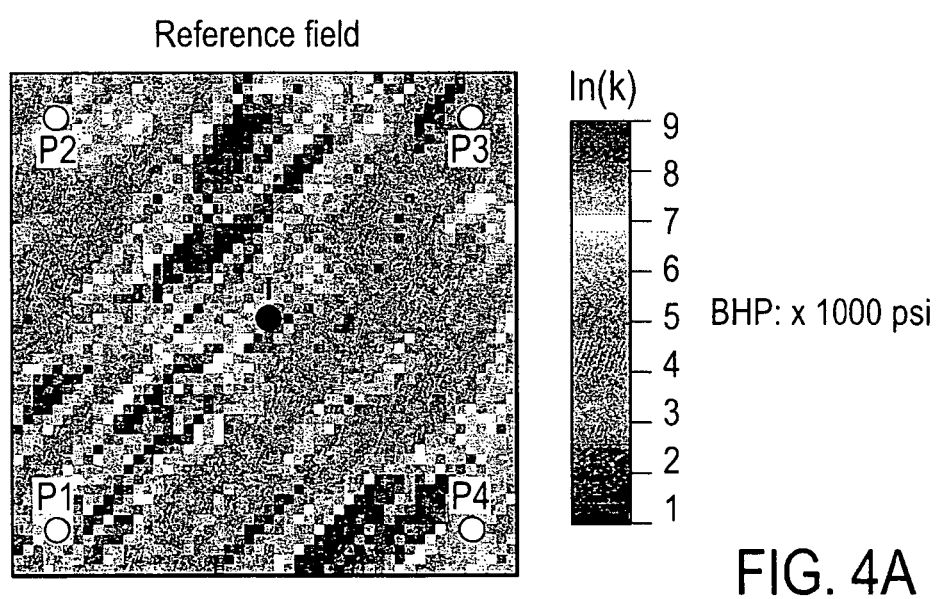
FIGS. 4(A)-(D) show a reference permeability field and graphs of production data.

FIG. 4A shows a 2-D geostatistical reference field (50×50×1 grid with cell size 20 feet×20 feet×2 feet). The model is generated using the Sequential Gaussian Simulation method. The ln(k) has a Gaussian histogram with mean and variance of 6.0 and 3.0, respectively. The unit of permeability is milli-Darcy. The variogram is spherical with range of 200 feet and 40 feet in the direction of 45 degrees and 135 degrees, respectively. It is assumed that an injection well (I) at the center of the model with 4 production wells (P1 to P4) at the 4 corners.

The main features of this reference field are: (1) a high permeability zone and a low permeability zone in the middle of the field, (2) high interconnectivity between well I and well P1, (3) low interconnectivity between well I and wells P3 and P4. This reference field is considered as the true model, and the goal is to reconstruct reservoir models, based on real-time production data, that are as close to the true field as possible.

Figure 4B:
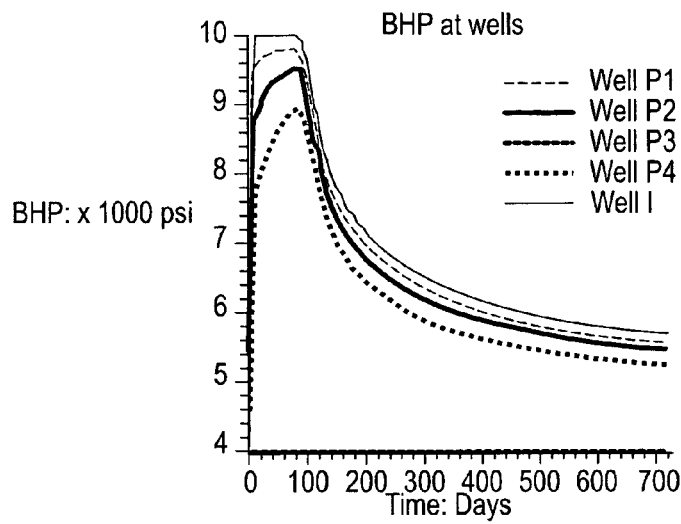
Figure 4C:
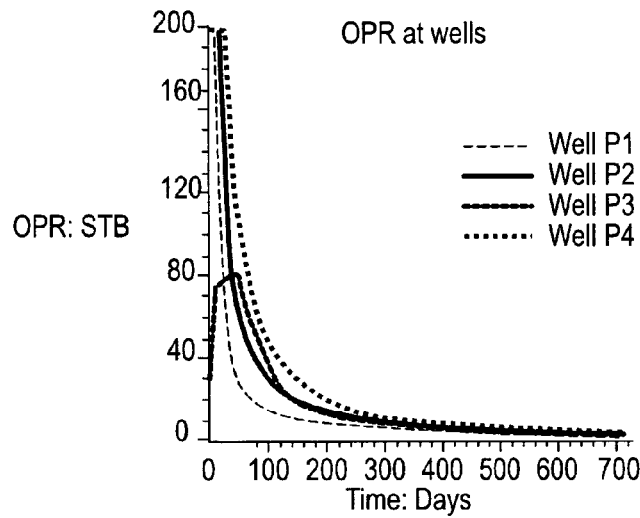
Figure 4D:
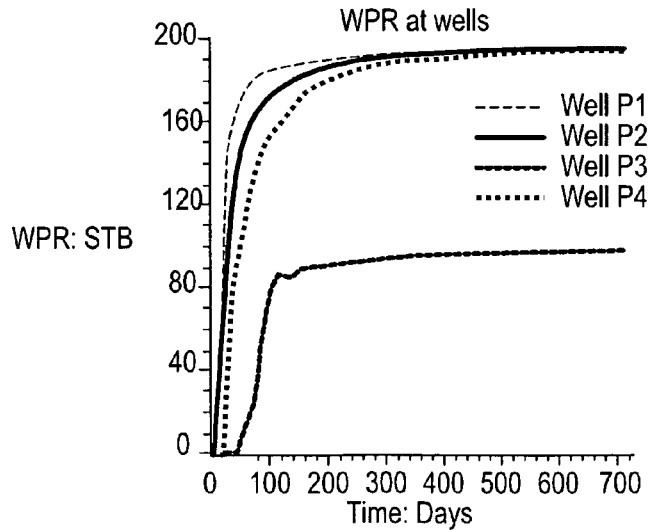
Figure 5A:
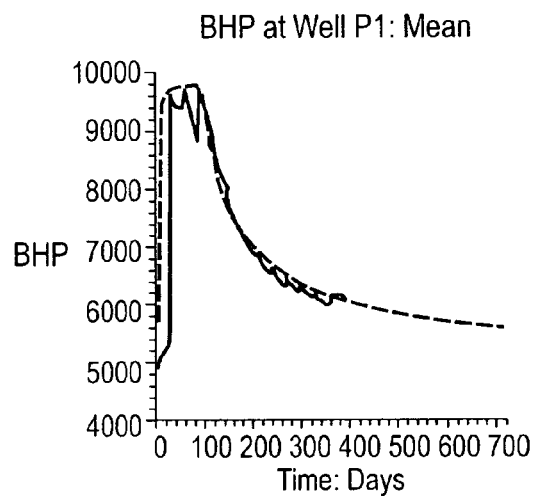
FIGS. 5(A)-(D) illustrate graphs with mean (left) and standard deviations (right) of BHP at a first production well P1 and water production (WPR) at a third production well P3 using the non-iterative EnKF updating process.
Figure 5B:
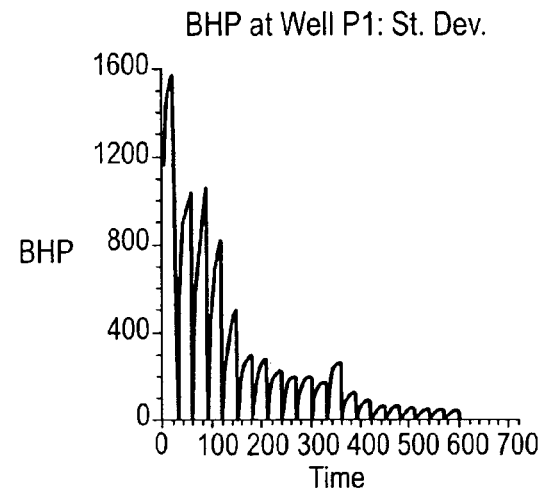
Figure 5C:
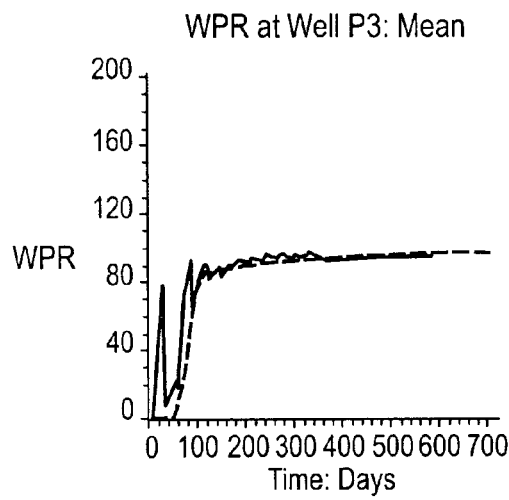
Figure 5D:
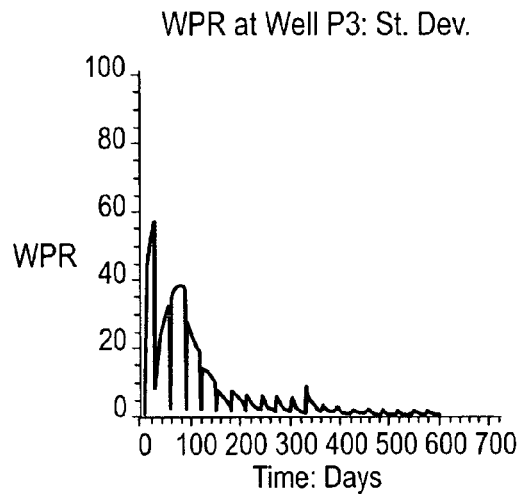
Figure 6A:
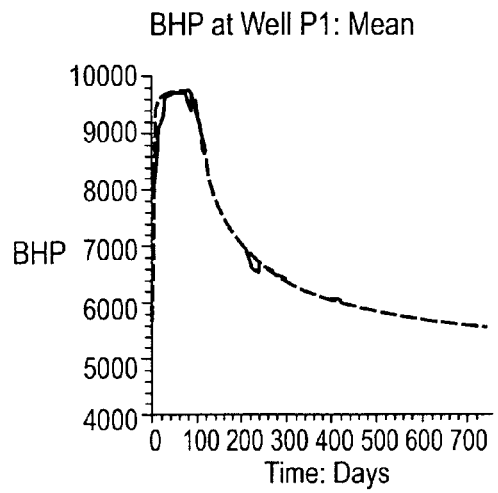
FIGS. 6(A)-(D) show graphs with mean (left) and standard deviation (right) of BHP at P1 and WPR using the interative EnKF updating process.
Figure 6B:
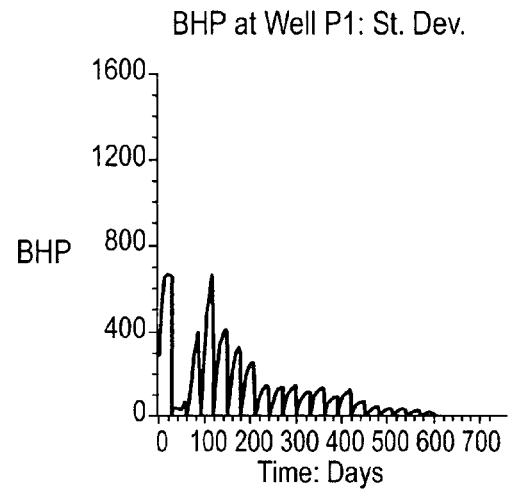
Figure 6C:
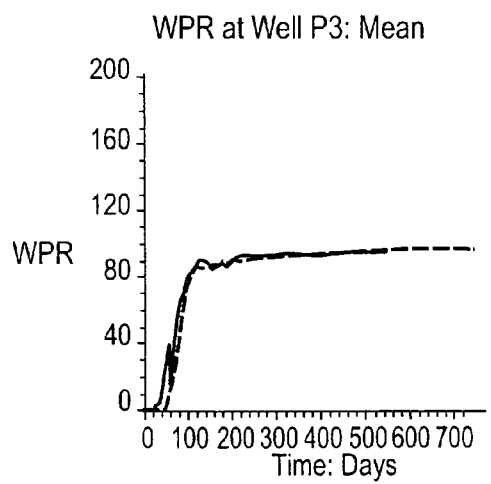
Figure 6D:
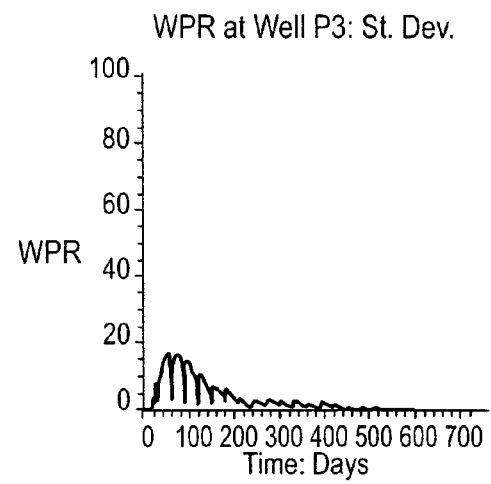
Figure 7A:
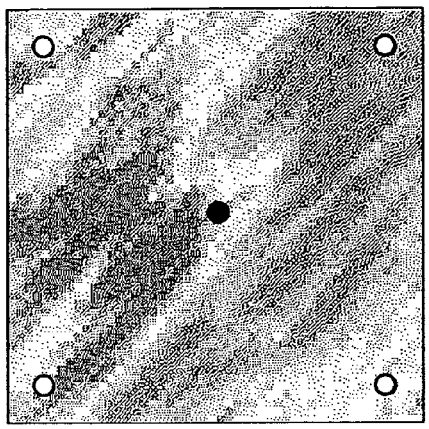
FIGS. 7(A)-(D) show mean and variance of 200 permeability models updated at 60 and 120 days using the non-iterative EnKF updating process. The dashed lines are the results from the true model.
Figure 7B:
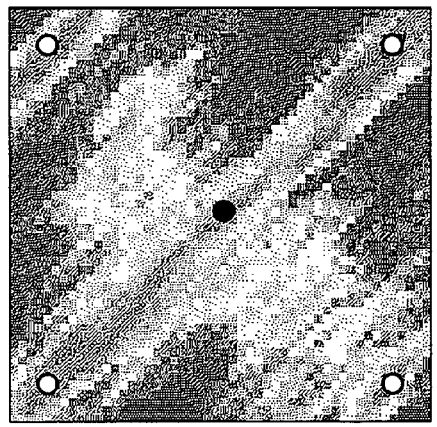
Figure 7C:
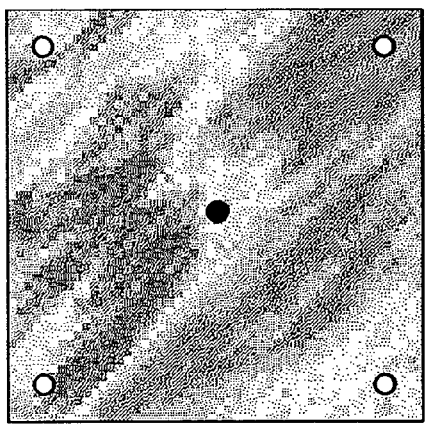
Figure 7D:
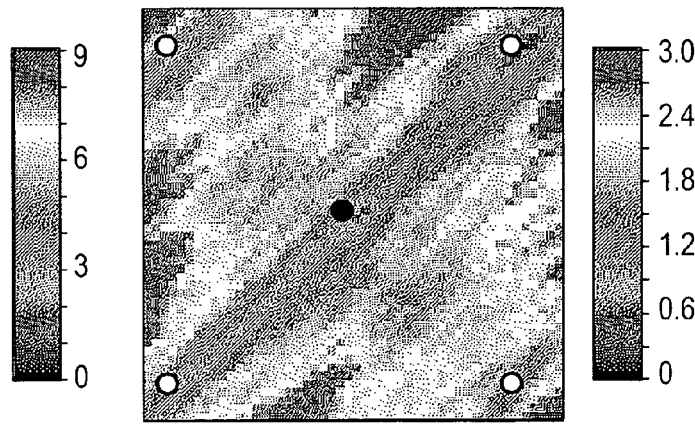

The reservoir is initially saturated with oil with constant initial pressure of 6000 psi at the top. The injection well has constant injection rate of 700 STB/day with a maximum bottom-hole pressure (BHP) control of 10000 psi. All producers are producing a constant total volume of 200 STB/day with minimum BHP control of 4000 psi. The mobility ratio of water and oil is 10 and standard quadratic relative permeability curves are used with zero residual saturation for oil and water. Compressibility and capillary pressure are ignored. Flow simulation is run to 720 days and results of BHP of each well, as well as oil production rates (OPR) and water production rates (WPR) at producing wells are shown in FIGS. 4(B)-(D). Note the fast water breakthrough and high water production rates at well P1, whereas for P3, water breakthrough is very late with small WPR and the BHP of this well drops to minimum control right after production, due to the low permeability around this well as well as low connectivity between this well and the injector.

The reference permeability field, as well as the simulated dynamic data (BHP, OPR and WPR) is considered as truth and it is assumed the measurements of BHP, OPR and WPR at wells are available every 30 days up to 720 days and they are directly read from the true data. The standard deviations of measurement errors are 3 psi, 1 STB, and 2 STB for BHP, OPR and WPR, respectively. Gaussian random errors are added to the perfect true production data to create a noisy data set. A perturbation vector with the same variances as measurement errors is then added to the noisy data to create an ensemble of production data.

An initial ensemble of permeability models are generated using the Sequential Gaussian Simulation method with the same histogram and variogram as the reference field. It is assumed that there is no hard permeability available, thus all initial models are unconditional. Conditional simulation can be used when there are hard and/or soft permeability data and they can be preserved during the EnKF updating. Other parameters (porosity=0.2, relative permeability curves, initial pressure=6000 psi, and initial water saturations=0.0) are assumed known without uncertainty. The ensemble of 200 initial permeability models are input to the EnKF and are updated at every 30 days assimilating the observed production data (BHP, OPR, and WPR) at the given times.

Iteration vs. No-Iteration.

FIGS. 5(A)-(D) and 6(A)-(D) show the variations of mean production data (BHP at P1 and WPR at P3) with time and the associated standard deviations (i.e., uncertainty) from the 200 models using the traditional EnKF (non-conforming and non-iteration) and the proposed iterative EnKF. For the iterative EnKF, a maximum of 5 iterations is used with damping parameter $\alpha$=0.5. It can be seen that for the traditional EnKF method, that the predicted production data at early time are significantly deviated from the observed data. Also at every assimilation time, EnKF updates the predicted data back to the observed ones with uncertainty reducing to almost zero. As more and more data are assimilated, the prediction data are getting closer and closer to the observed data with smaller and smaller uncertainty. Thus smaller and smaller updating is required for the models. Similar phenomenon is observed for the iterative EnKF, except that the predictions at the early time are much better and the uncertainties are much smaller. This indicates that the models updated by the iterative EnKF can provide more accurate predictions with less uncertainty when assimilating the same amount of data, particularly when only early time data are assimilated.

The mean/averaged permeability fields (i.e., the estimation) and the associated variance fields (uncertainty) computed from the ensemble at 60 and 120 days are given in FIGS. 7(A)-(D) and 8(A)-(D) for the non-iterative and iterative EnKF. Compared to the reference field in FIG. 4(A), it can be seen that results using iterative EnKF are slightly better in capturing the spatial variation features of the reference model and the resulting models have less uncertainty.

Figure 9A:
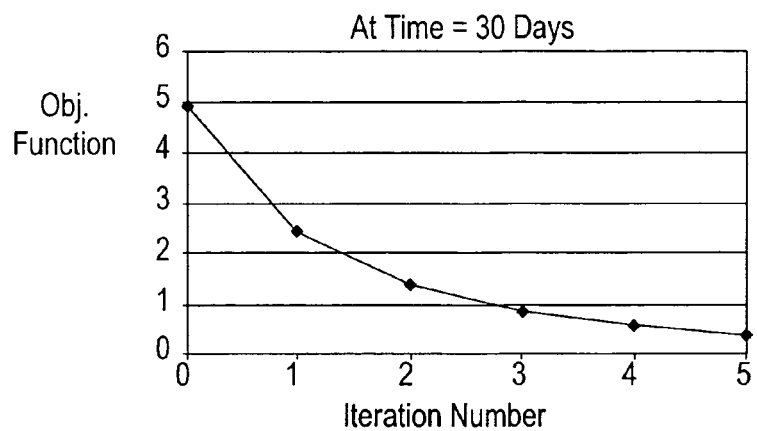
FIGS. 9(A)-(C) are graphs of the change of an objective function during iteration at different assimilation times.
Figure 9B:
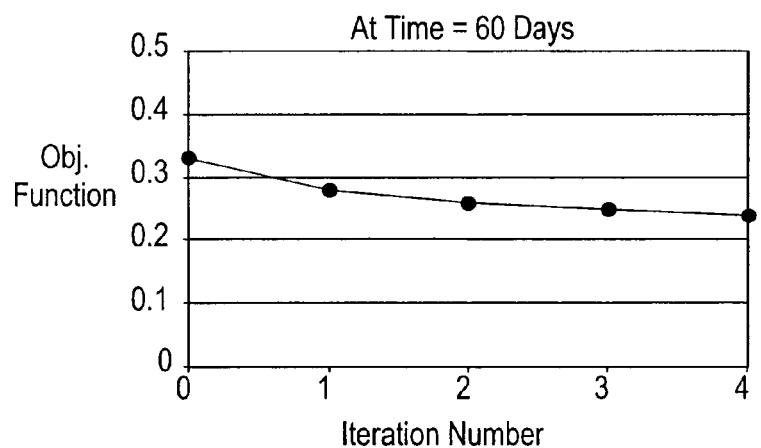
Figure 9C:
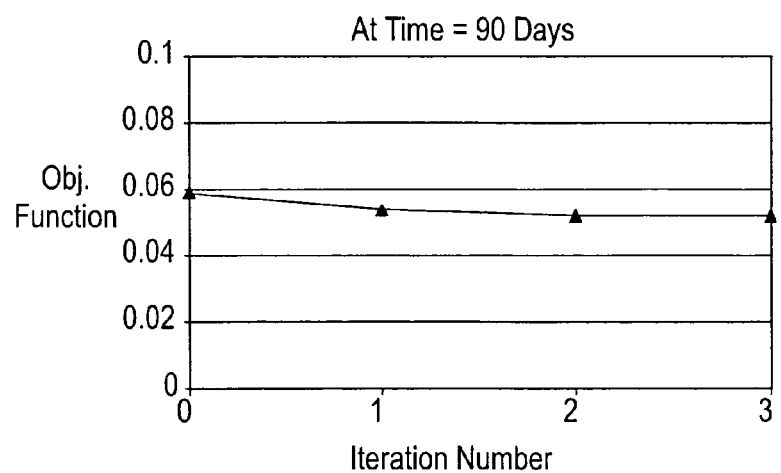
Figure 10A:
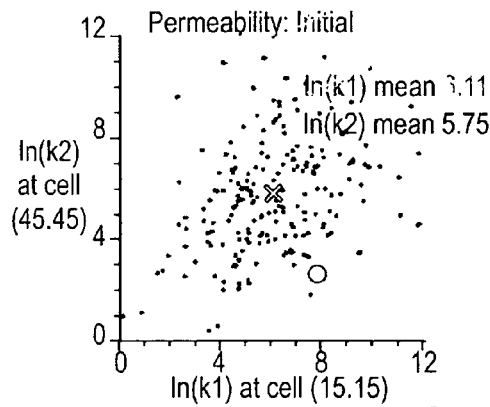
FIGS. 10(A)-(H) are graphs of permeability values updated by the iterative EnKF at different iterations and the corresponding production data computed from the updated permeability models. Crosses represent the mean of the 200 models and hollow dots are the true/observed value.
Figure 10B:
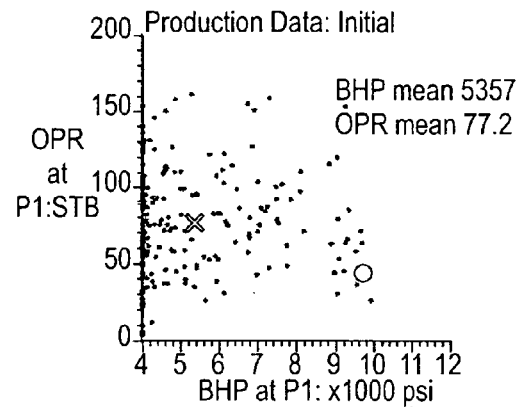
Figure 10C:
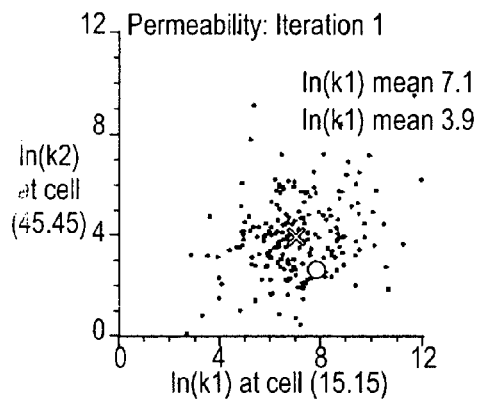
Figure 10D:
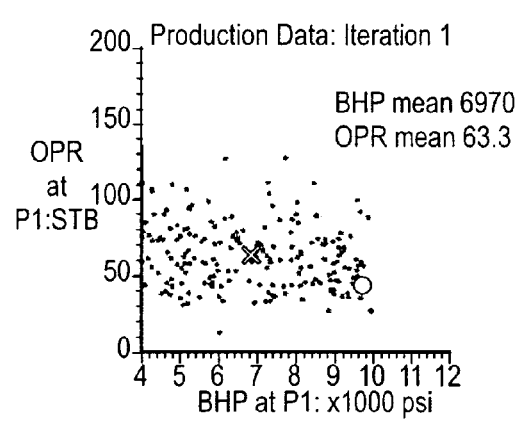
Figure 10E:
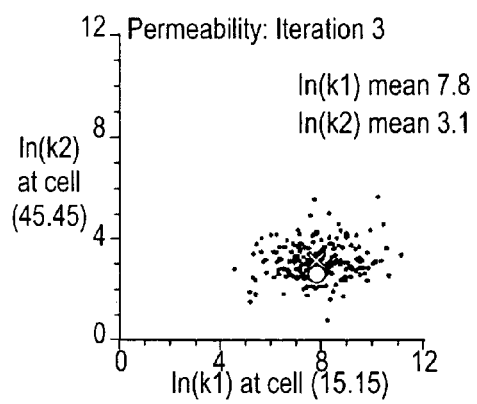
Figure 10F:
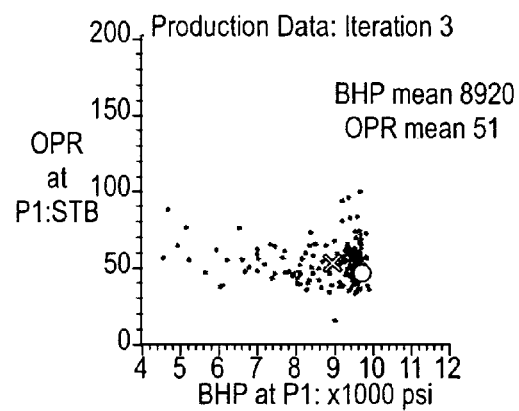
Figure 10G:
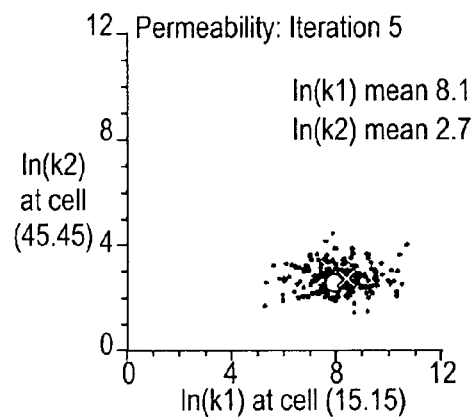
Figure 10H:
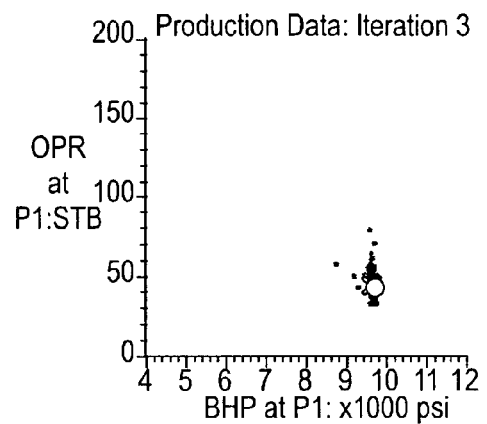

Note that 5 iterations are input for each EnKF updating step. In this example, however, iterations are only required at the first 3 assimilation steps (at 30, 60 and 90 days) with the actual iteration number of 5, 4, and 2, respectively. After step 3, the predicted production data are close enough to the observed data that no iteration is required. The variations of objective function at each iteration within the first 3 assimilation steps are given in FIGS. 9(A-(C). Note the significant decrease of the objective function for the first assimilation step (30 days) indicating the impact of iteration for early time when flow responses have strong non-linear features and large updating is needed for the model to match the production data. For the later times, the improvement of data matching is smaller.

FIGS. 10(A)-(G) shows the scatter plots of permeability values at two selected locations (cell (15, 15) and cell (45, 45) counting from the lower left corner) from the 200 ensemble models after each iteration within the first assimilation step (30 days). Also shown are the corresponding scatter plots of production data (BHP and OPR for well P1). It can be seen that initially, the permeability and predicted production data are widely spreading and centered at the wrong places indicating large uncertainty and inaccuracy in the predictions because no data are assimilated. Also the predicted production data, particularly the BHP, are not normally distributed. By assimilating the production data at 30 days with the iterative EnKF, both permeability values and predicted production data are gradually moving toward to the true model values and the observed production values after each iteration. At the end of the iteration, production data are closely matched and permeability values are scattering around the true values with small uncertainty. Note that the selected two locations are in important regions (between wells I and P1, between I and P3) where the values of permeability are critically important for matching production data. By assimilating the first data at 30 days, the permeability values at these two locations can be well identified already with small uncertainty. This allows an accurate permeability distribution to be obtained at the last iteration. Less accuracy and larger uncertainty would be expected at other locations (see FIGS. 7-8).

Figure 11A:
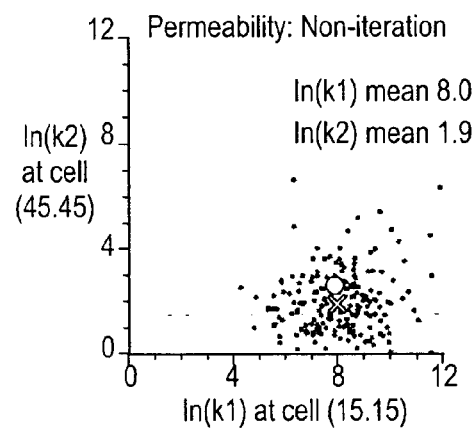
FIGS. 11(A)-(B) are graphs of permeability values updated by the non-iterative EnKF at 30 days and production data computed from the updated permeability models. Crosses are the mean of the 200 models and the hollow dots are the true/observed values.
Figure 11B:
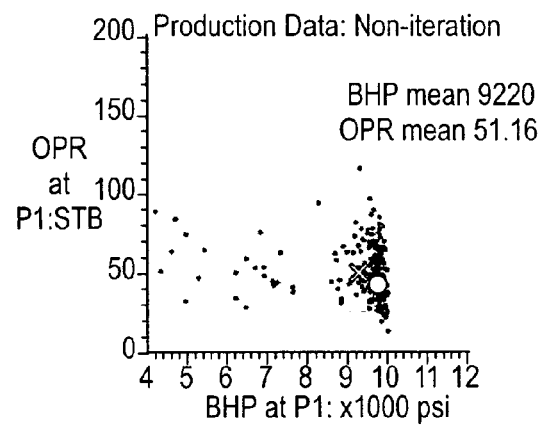
Figure 12A:
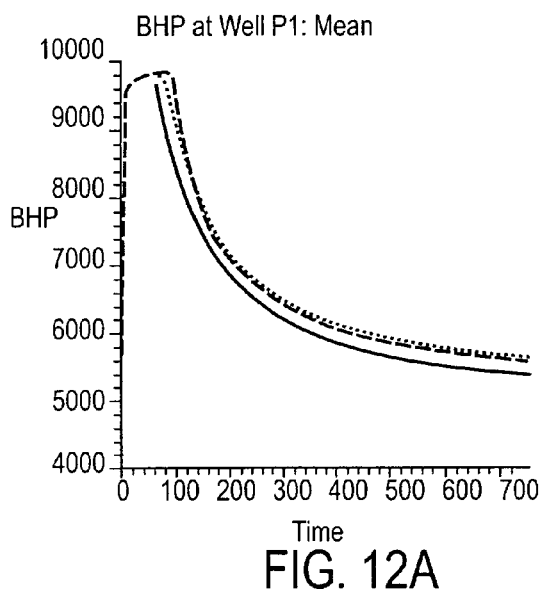
FIGS. 12(A)-(D) show graphs with the mean (top) and standard deviation (bottom) of production data predicted using permeability models updated at 60 days; dashed lines are for true data, solid lines are results from the non-iterative EnKF, and dotted lines are results from the iterative EnKF.
Figure 12B:
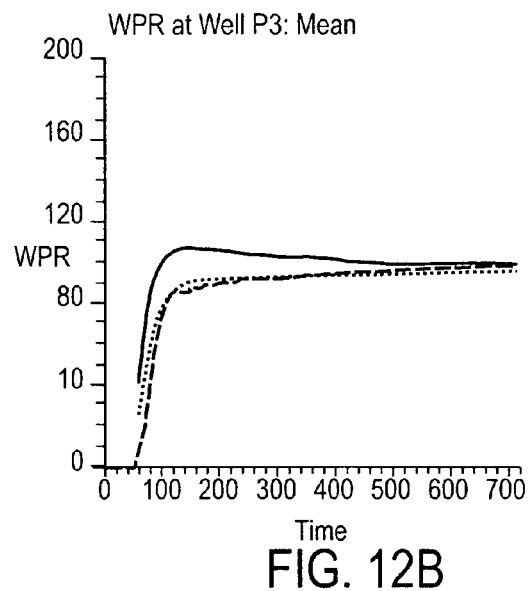
Figure 12C:
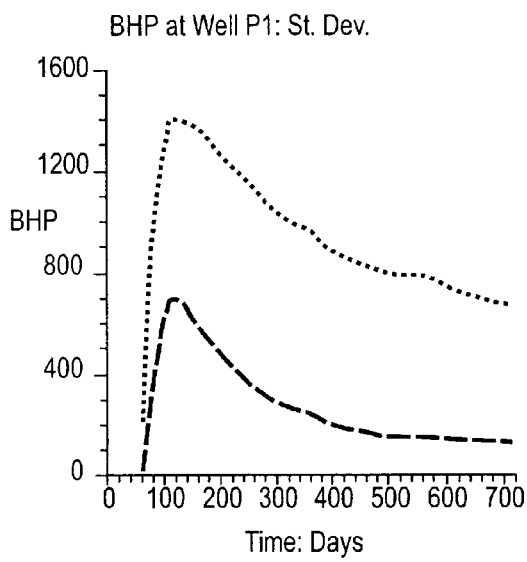
Figure 12D:
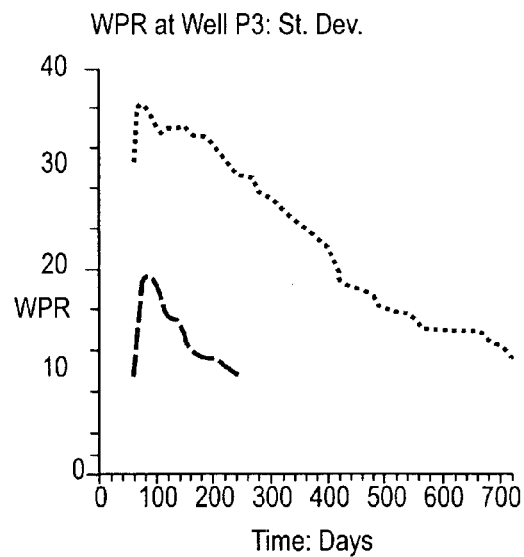
Figure 13A:
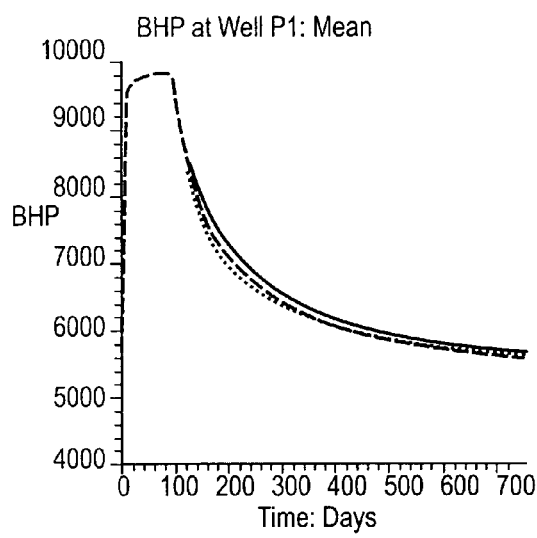
FIGS. 13(A)-(D) show graphs with the mean (top) and standard deviations (bottom) of production data predicted suing permeability models updated at 120 days; dashed lines are true data, dotted lines are results from the non-iterative EnKF, and dotted lines are results from the iterative EnKF; (Note the improved accuracy and reduced uncertainty compared to the results of FIG. 12)
Figure 13B:
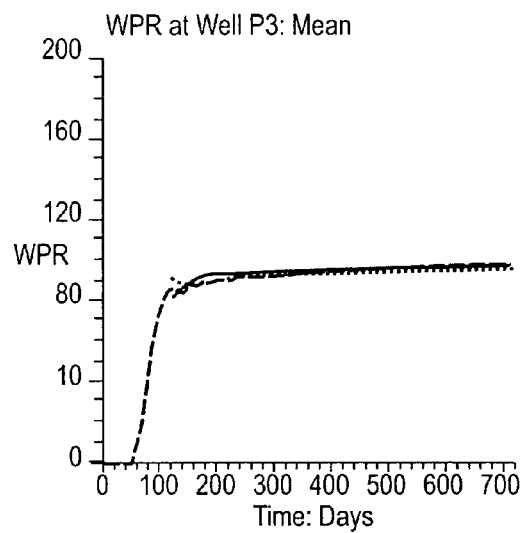
Figure 13C:
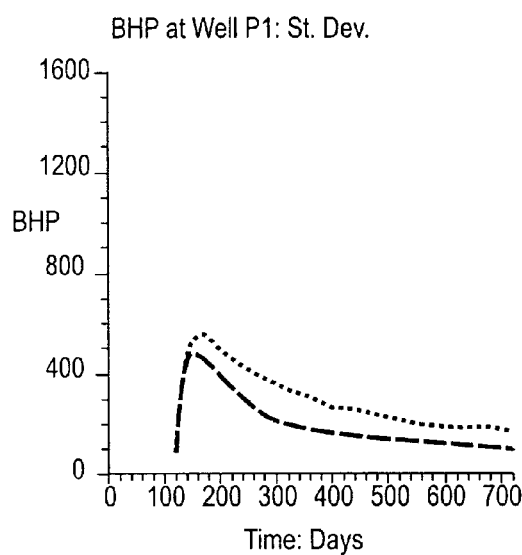
Figure 13D:
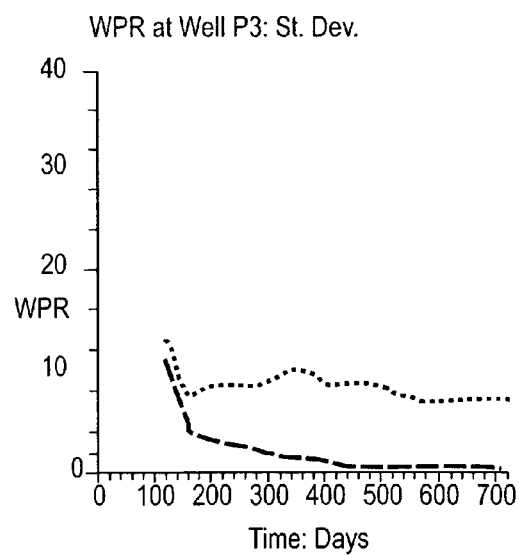
Figure 14:
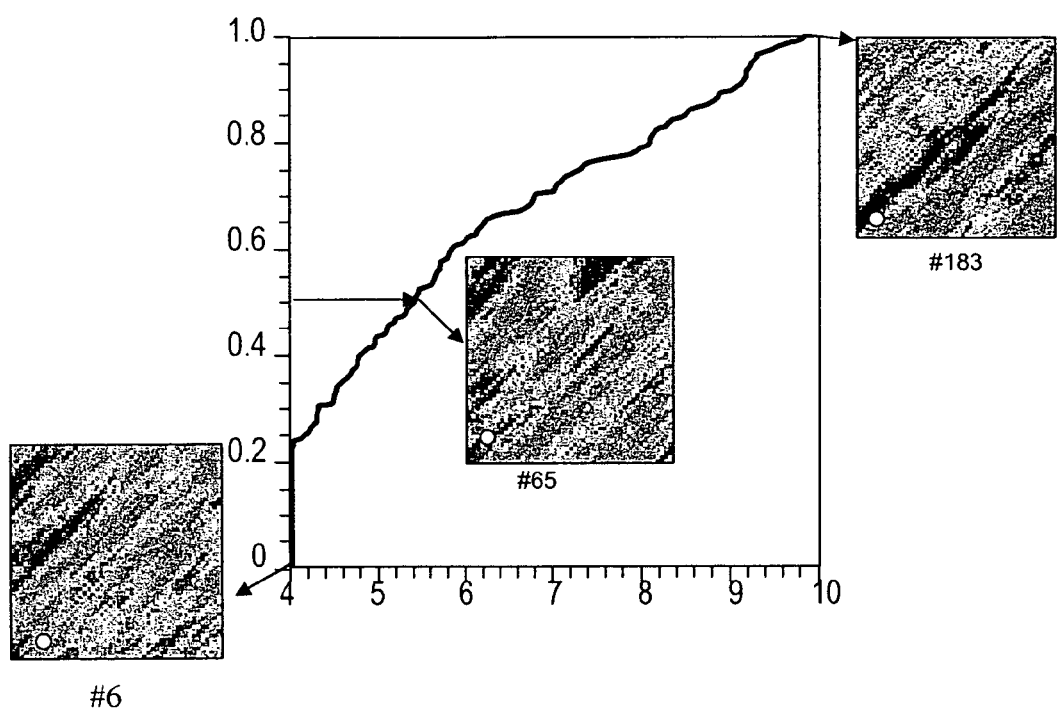
FIG. 14 shows a cumulative distribution function (cdf) of the most varying variable (BHP at a producing well P1)

On the other hand, for the non-iterative EnKF, models are updated only once using Eq. (4). The scatter plots of the updated permeabilities for the same locations and the predicted production data from well P1 are displayed in FIG. 11. It can be seen that the updated permeability models, as well as the predicted production data using the traditional one step updating are less accurate and subject to larger uncertainty compared to the proposed iterative EnKF method. The production data computed from the updated models still display strong non-Gaussian features.

Next, the predictive ability of the models updated by the traditional and iterative EnKF is compared. Prediction runs are performed to 720 days using all 200 models after assimilating data at 60 and 120 days using the two methods. FIGS. 12(A)-(D) shows the predictions of production data (mean and standard deviation of BHP at P1 and WPR at P3) from the 200 models updated at 60 days, whereas FIGS. 13(A)-(D) display the predictions using models updated at 120 days. From both figures, it can be seen that the predictions using the models updated by the iterative EnKF are both more accurate and less uncertain compared to the models updated by the non-iterative EnKF. Thus the real-time reservoir optimizations based on the predictions from the models updated by the iterative EnKF are likely to provide better production strategies to realize more production potential. For both methods, more accurate and less uncertain predictions are obtained when more production data are assimilated.

Reduction of Ensemble Size Via Re-sampling

The effectiveness of the proposed simple re-sampling method to reduce the ensemble size in EnKF will now be demonstrated. 200 initial models ($N_T$=200) are used and are run forward/prediction from 0 to 30 days. Based on the production data (BHP, OPR and WPR) at 30 days, the most varying variable is identified as the BHP at well P1. These initial 200 models are ranked based on the BHP at P1 from smallest to the largest value resulting in cumulative distribution function (cdf) as shown in FIGS. 14(A)-(F). Note that the smallest BHP at P1 is from model member 6 where permeability values around P1 are low, while the largest BHP at P1 is from model member 183 where P1 is located in a high permeability region that is well connected to the injector. From the 200 initial models, 50 members are sampled using uniform sample method based on the cdf, i.e., with interval of cdf=0.02. Clearly, the resulting 50 models can represent the same uncertainty space in terms of the BHP at well P1 as the original 200 models. Many models with flow responses that are too close to each other have been eliminated.

Figure 16A:
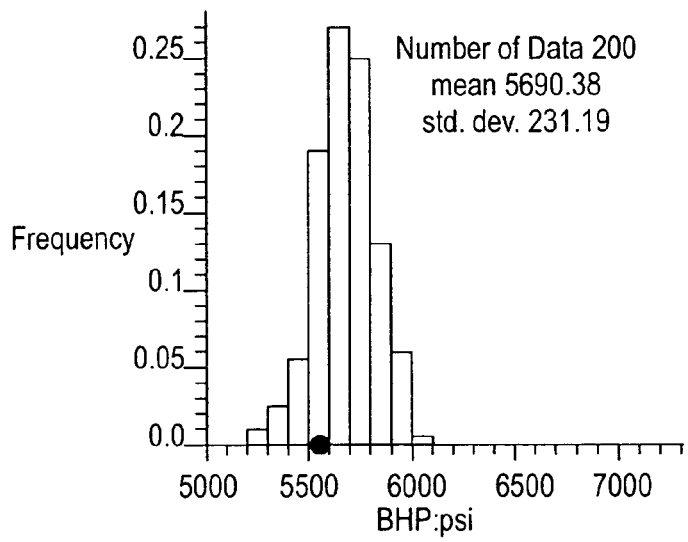
FIG. 16(A)-(C) depict histograms of the predicted Bottom Hole Pressure (BHP) at production well P1 at 720 days from the updated models at the last time step with different initial ensemble sets (bullets are the true results.)
Figure 16B:
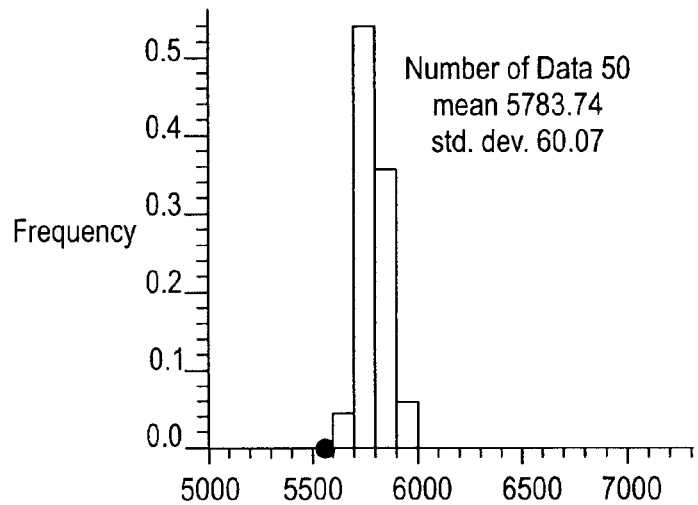
Figure 16C:
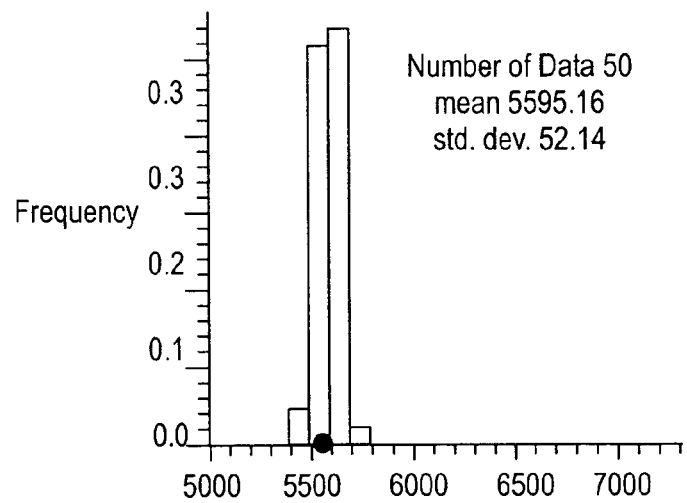
Figure 17A:
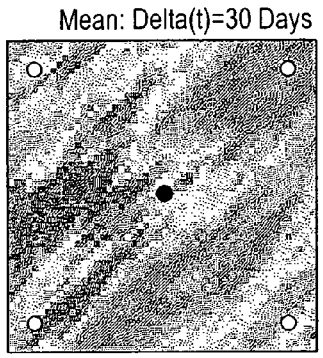
FIGS. 17(A)-(H) illustrate mean and variance of 200 permeability models updated at 300 days with different assimilation time interval $\Delta_t$ using a non-iterative EnKF updating scheme.
Figure 17B:
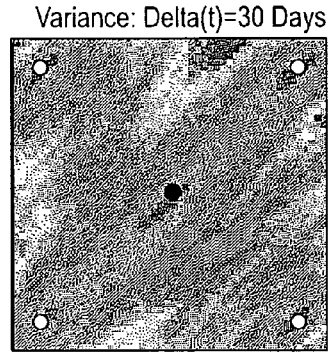
Figure 17C:
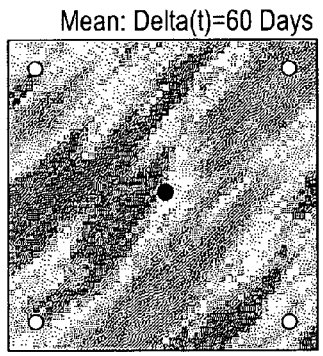
Figure 17D:
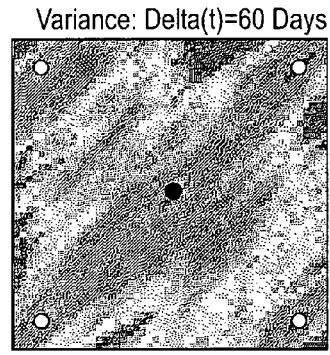
Figure 17E:
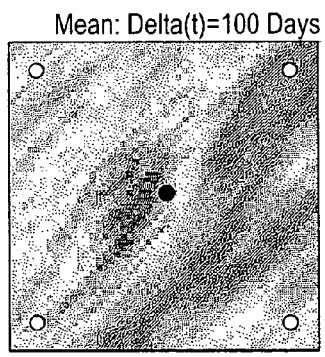
Figure 17F:
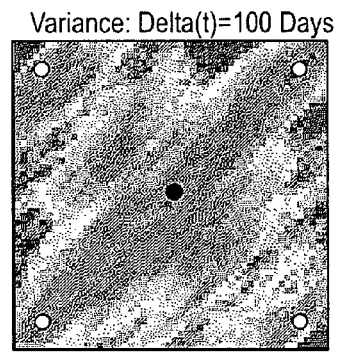
Figure 17G:
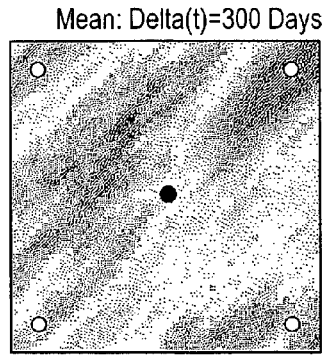
Figure 17H:
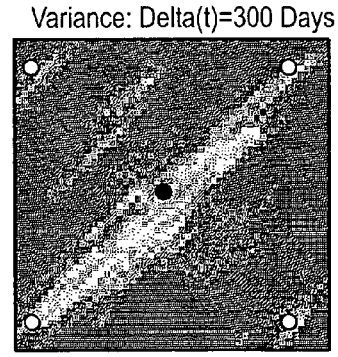
Figure 19A:
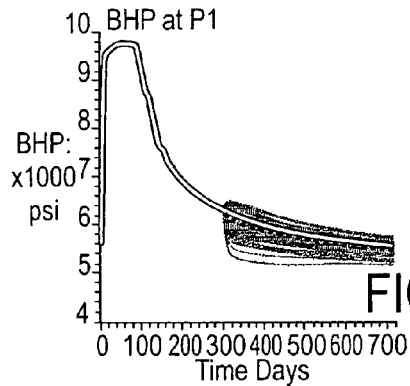
FIGS. 19(A)-(H) show graphs of production data based on the models updated at 300 days using the non-iterative ENKF updating scheme. The white lines are from the reference field and dotted lines are the mean of the predictions.
Figure 19B:
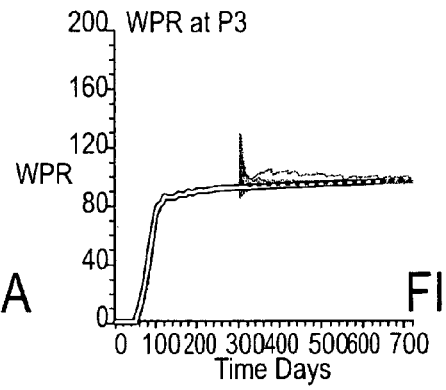
Figure 19C:
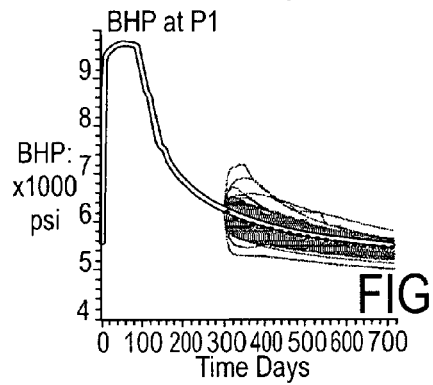
Figure 19D:
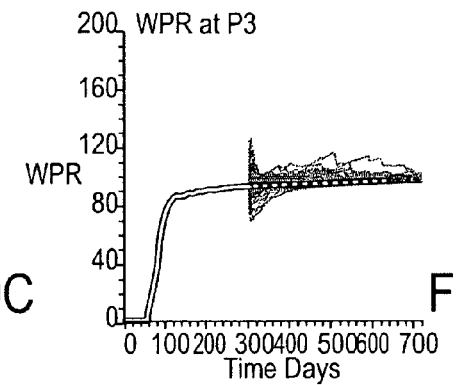
Figure 19E:
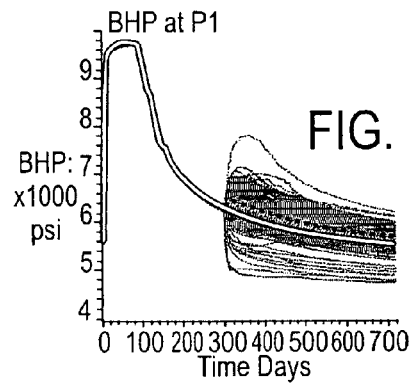
Figure 19F:
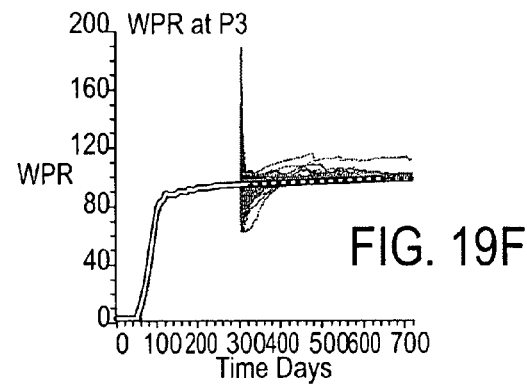
Figure 19G:
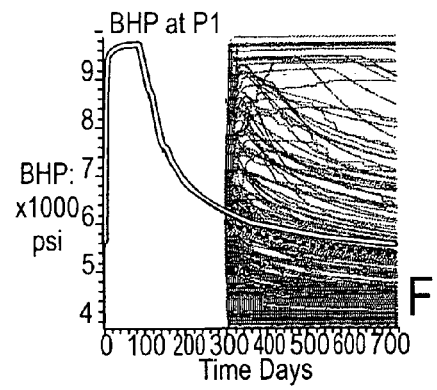
Figure 19H:
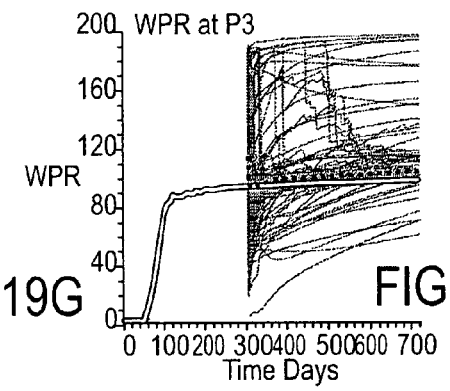
Figure 20A:
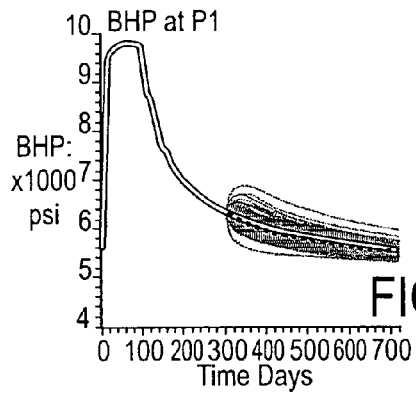
FIGS. 20(A)-(H) show graphs of predictions of production data based on the models updated at 300 days using the interative EnKF. The white lines are from the reference field and dotted lines are the mean of the predictions.
Figure 20B:
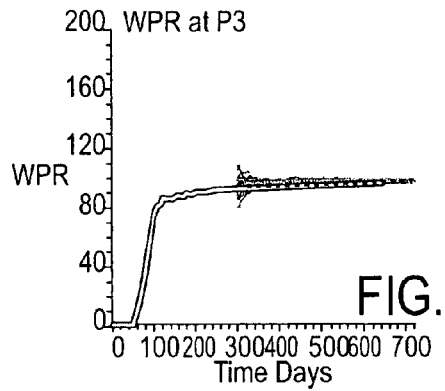
Figure 20C:
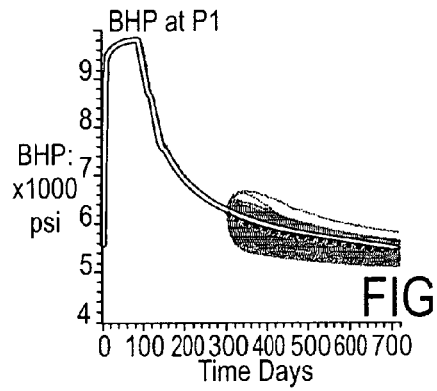
Figure 20D:
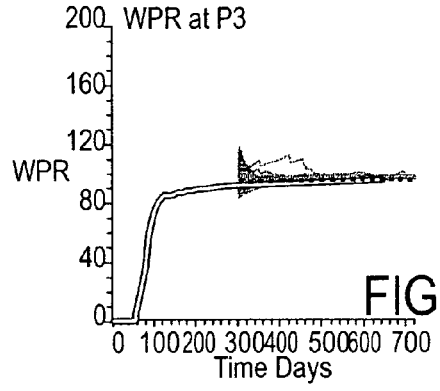
Figure 20E:
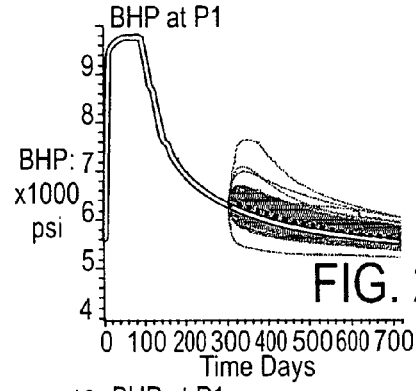
Figure 20F:
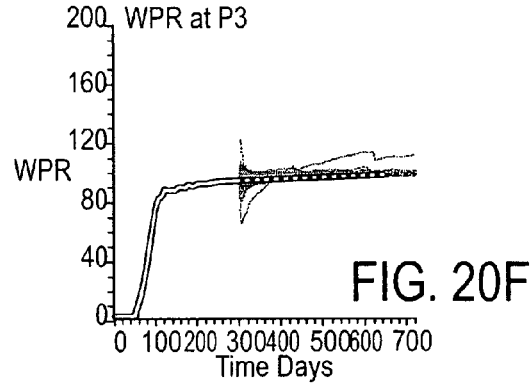
Figure 20G:
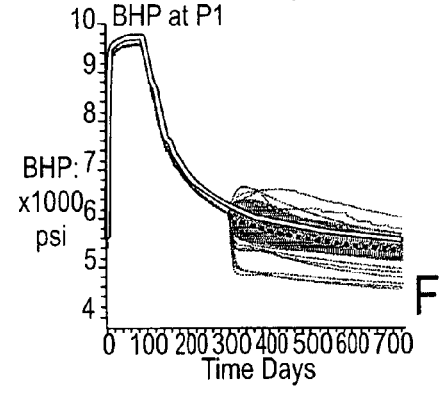
Figure 20H:
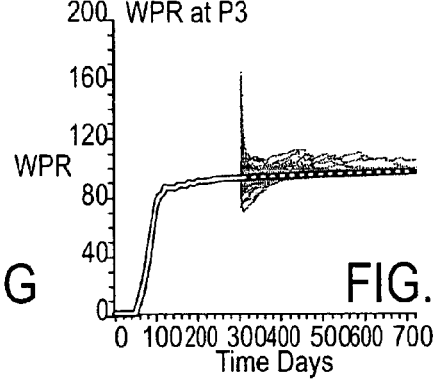
Figure 21A:
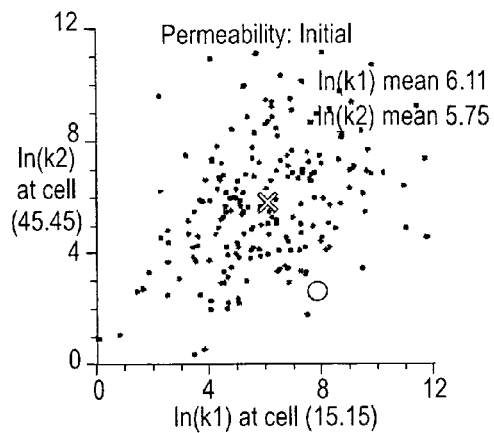
FIGS. 21(A)-(H) shows graphs of permeability values updated by the iterative EnKF at different iterations and the corresponding production data computed from the updated permeability models at 300 days. The crosses are the mean of the 200 models and the hollow dots are the true/observed data.
Figure 21B:
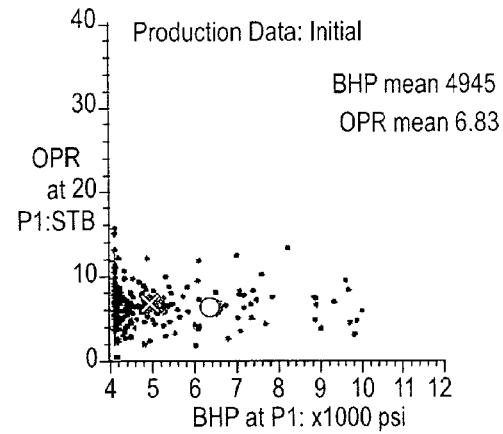
Figure 21C:
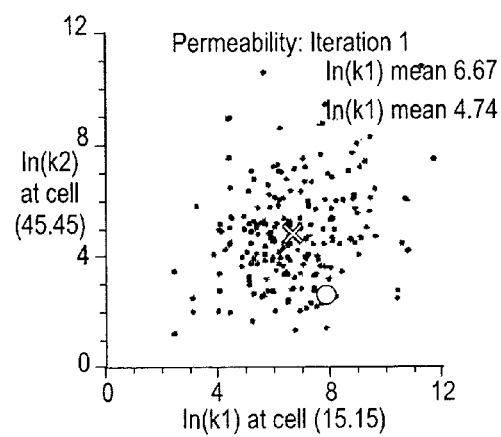
Figure 21D:
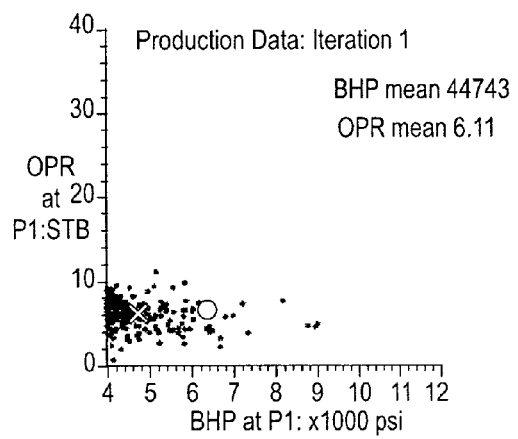
Figure 21E:
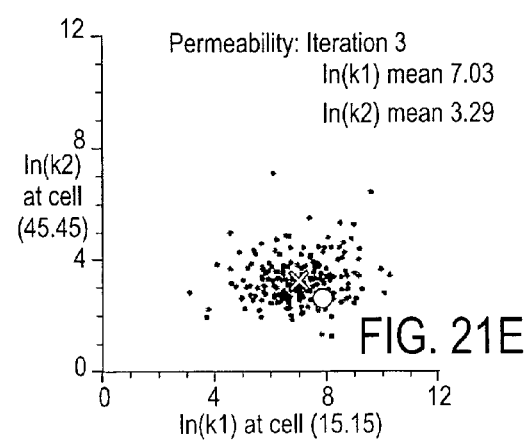
Figure 21F:
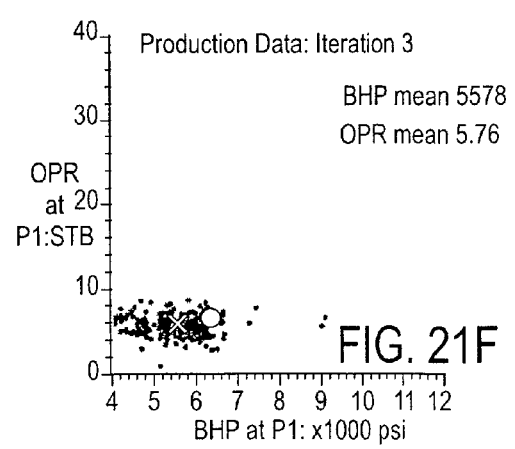
Figure 21G:
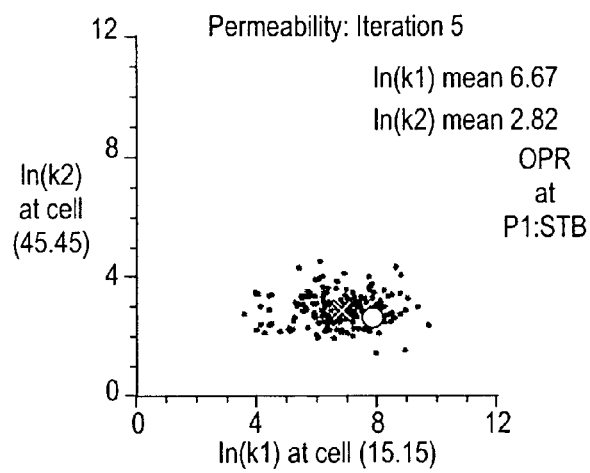
Figure 21H:
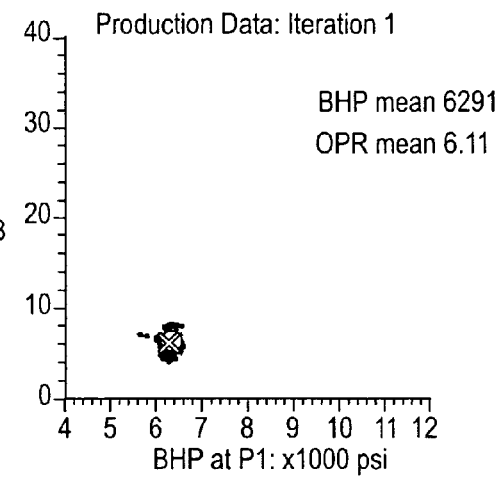

The re-sampled 50 models are then used for the proceeding EnKF updating. For comparison, EnKF updating is performed using the first 50 models of the initial 200 models, representing the 50 randomly sampled initial members. The EnKF is then used with the conforming step only to update the models assimilating the same production data as shown in FIG. 4. Based on the permeability models updated at the last time step (720 days) using the different initial ensemble sets, the flow simulations are rerun for the entire production history using the all updated models. FIGS. 15(A)-(F) show the BHP for wells PI and P4 using three different initial ensemble sets: 200 random, 50 random, and 50 re-sampled from the 200 random members. The histograms of BHP at P1 at 720 days are displayed in FIG. 16. From these two figures, it can be seen that:

(1) 200 randomly sampled ensemble members seem enough to provide reasonable predictions and the associated uncertainty;
(2) 50 randomly sampled members are not enough resulting in imprecise predictions (observed production data are outside the envelope of predictions); and
(3) using the 50 initial models re-sampled from the 200 random members, the predictions are both more precise (mean of predictions close to the observation) and more accurate (less spreading) compared to the use of 50 random members. This clearly demonstrates the effectiveness of the proposed re-sampling approach to reduce the ensemble size.

Effect of Assimilation Time Interval

The time interval between the two EnKF assimilation steps is also an important issue for the practical application of EnKF. In general, assimilation is needed whenever significant flow behavior changes occur such as adding new wells in the reservoir system, well converting, or well shut-in. Production data might be observed at different frequency and permanent sensors might acquire data at very high frequency. According to the EnKF theory, it is preferable that the assimilation time at an interval to not be too small or too large. Production data may be redundant and correlated, and thus no new information can be absorbed when the selected points are too closely observed in time. On the other hand, if assimilation time interval is too large, the model parameters and production data may be highly non-linear causing problems in filter updating, such as filter divergence.

In order to investigate the impact of using different sizes of assimilation time interval, EnKF is used to update 200 reservoir models assimilating production data at different time intervals (30, 60, 100 and 300 days). Both the non-iterative and iterative EnKF methods are used. FIGS. 17(A)-(B) and 18(A)-(B) show the resulting mean and variance of the 200 models updated at 300 days using the non-iterative and iterative EnKF. The predictions of well performances from 300 days to 720 days using the models updated at 300 days are given in FIGS. 19(A)-(B) and 20(A)-(B).

From these figures, it can be seen that:
(1) when small time intervals (e.g., 30 or 60 days) are used, the updated models and the associated uncertainty, as well as the predictions using these models are very similar whether or not the iteration is used in EnKF updating;
(2) when larger time intervals (e.g., 100 or 300 days) are used, we see significant difference between the results using the iterative EnKF and those using the non-iterative EnKF. The updated models using the iterative EnKF are visually better than those updated by the non-iterative EnKF. The predictions using models updated by the non-iterative EnKF are subject to much larger uncertainty than those from the iterative EnKF. This again demonstrates that models updated by the iterative EnKF provide more accurate predictions with less uncertainty; and
(3) more importantly, with the non-iterative EnKF, the quality of updated models and the predictions displays significant difference when different assimilation time intervals are used (see FIGS. 17 and 19). While, the difference in quality using different time intervals are much smaller with the iterative EnKF.

Models updated by using the non-iterative EnKF are not reliably providing good predictions when assimilation time interval is large. Whereas, reliable models can still be obtained with the iterative EnKF. While not wishing to be held to a particular theory, this may be due to the fact that the use of iteration in EnKF can stabilize the update process and correct the non-linearity.

Finally, the updating process of permeability and production data during the first assimilation time step using time interval of 300 days is shown. FIG. 21 (top row) shows the scatter plots of initial permeability values at two locations, as well as the predicted production data (BHP and OPR at well P1) at 300 days from the 200 initial models. It can be seen that the initial model and production variables are significantly different from the true and observed values with large uncertainty. The distribution of production data, particularly for BHP, displays non-Gaussian features.

Using an assimilation time step of 300 days, FIG. 21 (from the second row to the bottom row) displays the scatter plots of updated permeability values, as well as the predicted production data at different iterations for the first assimilation time using the iterative EnKF. Clearly, the permeability values are gradually moved toward the true values with the predicted production data getting closer and closer to the observed values. At the end of the iteration, excellent permeability values and production predictions are obtained, which is very similar to the results shown in FIG. 10. This again demonstrates the robustness of the iterative EnKF, i.e., accurate updating and good matching of production data can be obtained even with a large assimilation time interval. The iteration within the EnKF updating serves as a correcting process for the non-linearity and non-Gaussianity.

Figure 22A:
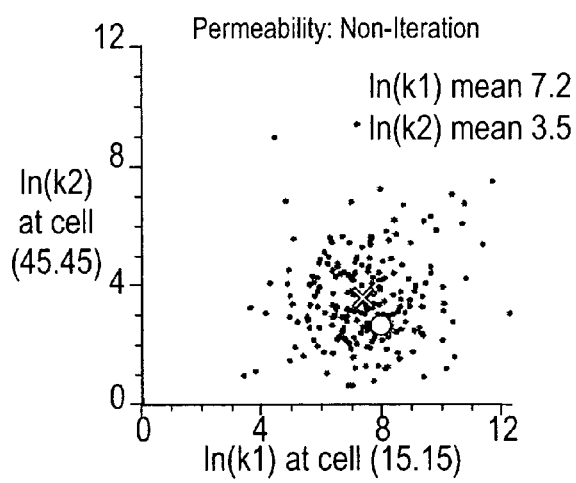
FIGS. 22(A)-(B) shows graphs of permeability values updated by the non-iterative EnKF at 300 days and production data computed from the updated permeability models. Crosses are the mean of the 200 models and hollow dots are the true/observed value.
Figure 22B:
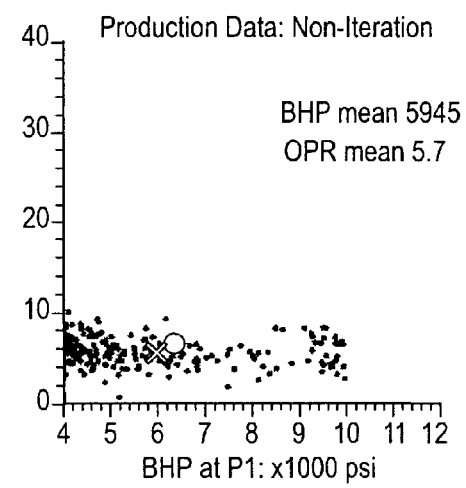

As a comparison, using the non-iterative EnKF, the updated permeability, and the predicted production data based on the updated models are given in FIGS. 22(A)-(B). Compared to the initial models, the values of updated permeability are moved closer to their true values, resulting in improved predictions. But the updated permeabilities are still subject to large uncertainty, resulting in poor matching of predicted production data to the observed data due to the use of large assimilation time interval (300 days). These results are not as good as the results using smaller time interval shown in FIG. 11 indicating the sensitivity of using different time interval size for the non-iterative EnKF.

Traditional and conforming EnKF for continuous updating of reservoir models to assimilate real-time production data have been reviewed. An iteration process has been introduced during the EnKF updating to further account for the non-linearity and non-Gaussianity in the system. A simple uniform re-sampling scheme is introduced to reduce the size of ensemble. This re-sampling scheme uses the ranking information of the most varying production data computed at the first assimilation step to ensure that the selected small ensemble members have the same uncertainty space span in terms of the selected production data as the large initial ensemble set. The sensitivity of using different assimilation time interval is also investigated.

From the above example, the following conclusions can be drawn:
(1) EnKF is efficient and robust for real-time reservoir updating to assimilate up-to-date production data;
(2) the traditional non-iterative EnKF, being affected by the non-linear and non-Gaussian features in the reservoir and flow systems, may provide inaccurate updating. Also the results are sensitive to size of the assimilation time interval; and
(3) by introducing the iteration within the EnKF updating process, more accurate models are obtained with less uncertainty, resulting in better matching of production data and more accurate predictions. Also the filter updating process becomes more stable.
(4) iteration is needed only at early time or when significant flow behavior changes, e.g., when adding wells or well shut-in. These are the times when system displays strong non-linear features.
(5) The proposed re-sampling scheme is simple, easy to implement, yet very efficient. It accounts for the flow behavior which is a major difference from the other methods.

Nomenclatures
 $C_d$=Covariance of production data error
 $C_y$=Covariance matrix of state vector
 $c_{m,j}$=Element in $C_y$
 d=Production data vector
 F=Forward flow simulator
 G=Kalman gain
 H=Matrix operator that relates state vector to production data in state vector
 I=Identity matrix
 ln(k)=Natural logarithm of permeability
 $m_s$=Static variables
 $m_d$=Dynamic variables
 N=Total number of active cells in reservoir model
 $N_d$=Dimension of production data vector
 $N_e$=Number of realizations in ensemble

17

$N_T$=Number of realizations in initial ensemble
$N_y$=Dimension of state vector
t=Time
Y=Ensemble of state vector
$\bar{Y}$=Mean of the state vector
y=State vector Subscript
  k=Time index
  j=Ensemble member index Superscript
  f=Forecast
  i=Iteration index
  T=Transpose
  u=Updated

What is claimed is:

1. A computer-implemented method for updating an ensemble of reservoir models to reflect the most current measured production data and to accurately predict reservoir performance, the method comprising:
  (a) generating an ensemble of reservoir models, the ensemble being represented, at a first time step, by an initial state vector of static and dynamic state variables;
  (b) from the first time step to a second time step, forecasting forward the initial state vector to compute a forecasted state vector which includes forecast static and dynamic variables and forecast production data;
  (c) computing a gain based upon measured production data and the forecast production data;
  (d) computing an updated state vector utilizing the computed gain of step (c), the updated state vector including updated static state variables;
  (e) creating a conforming state vector including the updated static state variables of step (d) and the initial dynamic state variables of step (a); and
  (f) from the first time step to the second time step, forecasting forward the conforming state vector to compute a forecasted conforming state vector which includes new forecast static and dynamic state variables that are in conformance with one another;
  whereby the ensemble of reservoir models is updated on a computer with the forecasted conforming state vector which includes the new forecast static and dynamic state variables that are in conformance with one another.

2. The method of claim 1 wherein:
  the initial, forecast, updated and new forecast static state variables include at least one of permeability and porosity.

3. The method of claim 1 wherein:
  the initial, forecast, updated and new forecast dynamic state variables include at least one of pressure and saturation.

4. The method of claim 1 wherein:
  the gain is a Kalman gain.

5. The method of claim 4 wherein:
  the Kalman gain is computed using the following mathematical expression:

$$G_k = C_{y,k}^f H_k^T (H_k C_{y,k}^f H_k^T + C_{d,k})^{-1}$$

where
  $G_k$=the Kalman gain for time $t_k$;
  $C_{y,k}^f$=the covariance matrix of forecasted state vector;
  $H_k$=a matrix operator that relates the forecasted state vector to production data vector in the initial state vector; and
  $C_{d,k}$=the covariance matrix of measured production data error.

18

6. The method of claim 1 wherein:
  the updated state vector is computed using the following mathematical expression:

$$y_{k,j}^u = y_{k,j}^f + G_k (d_{k,j} - H_k^f)$$

where:
  $y_{k,j}^u$=the updated state vector at time $t_k$;
  $G_k$=the computed gain of step (c), the gain being a Kalman gain;
  $d_{k,j}$=the measured production data at time $t_k$;
  $H_k$=a matrix operator that relates the forecasted state vector to production data vector in the initial state vector; and
  $y_{k,j}^f$ 32 the forcasted state vector.

7. The method of claim 6 further comprising the step of:
  computing an objective function representative of the difference between the measured production data and forecasted production data.

8. The method of claim 1 wherein:
  the computing of the updated state vector includes using a damping factor.

9. The method of claim 1 for the comprising:
  computing an objection function based on the measured production and the forecasted production data and replacing the initial state vector with the forecasted conforming state vector; and iterating steps (b)-(f) utilizing a damping factor until the objective function is within a predetermined criteria.

10. The method of claim 9 wherein:
  the damping factor is computed using the mathematical expression:

$$y_{k-1,j}^{u,i+1} = y_{k,j}^{u,f} + \alpha_k^i G_k^i (d_{k,j}^i - H_k^{f,i})$$

where
  $\alpha_k^i$ is the damping factor at time $t_k$ at iteration i with value between 0 and 1;
  $y_{y,j}^{u,i+1}$=the updated state vector at time $t_k$ at iteration i+1;
  $y_{k,j}^{u,i}$=the updated state vector at time $t_k$ at iteration i;
  $G_k^i$=the computed gain of step (c), the gain being a Kalman gain at the iteration i;
  $d_{k,j}^i$=the measured production data at time $t_k$ at iteration i;
  $H_k$=a matrix operator that relates the forecasted state vector to production data vector in the initial state vector at time $t_k$; and
  $y_{k,j}^{f,i}$=the forecasted state vector at time $t_k$ at iteration i.

11. The method of claim 1, wherein the updated ensemble of reservoir models is further updated by performing the steps of:
  (g) computing a second gain based upon new measured production data and the forecasted eon conforming state vector;
  (h) computing a second updated state vector utilizing the second gain, the second updated state vector including new updated static state variables;
  (i) creating a second conforming state vector including the new updated static state variables and the new forecast dynamic state variables; and
  (j) from the second time step to a third time step, forecasting forward the second conforming state vector to compute a second forecasted conforming state vector which includes second forecast static and dynamic state variables that are in conformance with one another;
  whereby the ensemble of reservoir models is frtrther updated on the computer with the second forecasted conforming state vector which includes the second forecast static and dynamic state variables that are in conformance with one another.

12. A program storage device readable by a machine, tangibly embodying a program of executable instructions when executed by the machine perform method steps for updating an ensemble of reservoir models, conducting a reservoir simulation, said method steps comprising:
(a) generating an ensemble of reservoir models, the ensemble being represented, at a first time step, by an initial state vector of initial static and dynamic state variables;
(b) from the first time step to a second time step, forecasting forward the initital state vector to compute a forecasted state vector which includes forecast static and dynamic state variables and forecast production data;
(c) computing a gain based upon the forecasted state vector and measured production data;
(d) computing an updated state vector including updated static variables utilizing the computed gain of step (c);
(e) creating a conforming state vector including the updated static state variables of step (d) and the initial dynamic state variables of step (a); and
(f) from the first time step to the second time step, forecasting forward the conforming state vector to compute a forecasted conforming state vector which includes new forecast static and dynamic state variables that are in conformance with one another;
whereby the ensemble of reservoir models is updated with the forecasted conforming state vector which includes the new forecast static and dynamic state variables that are in conformance with one another.

13. A comnputer-implemented method for updating an ensemble of reservoir models to reflect the most entreat measured production data and to accurately predict reservoir performance, the method includes the steps of generating an ensemble of reservoir models such that the ensemble it represented at a first time step by an initial state vector which includes initial state and dynamic state variables, forecasting from the first time step to a second time step the initial state vector to compute a forecasted state vector which includes forecast static and dynamic state variables and forecast production data, computing a Kalman gain based upon measured production data and the forecast production data, and utilizing the Kalman gain to compute an updated state vector including updated static state variables, wherein the improvement comprises additionally performing the steps of:
(a) creating a conforming state vector including the updated static state variables and the initial dynamic state variables; and
(b) forecasting from the first time to the second time step the conforming state vector to compute a forecasted conforming state vector which includes new forecast static and dynamic state variables that are in conformance with one another;
whereby the ensemble ot reservoir models is updated on a computer with the forecasted conforming state vector winch includes the new forecast static and dynamic state variables that are in conformance with one another.

14. The method of claim 13, wherein the updated ensemble of reservoir models is further updated by performing the steps of:
(c) computing a second gain based upon new measured production data and the forecasted conforming state vector;
(d) computing a second updated state vector utilizing the second gain, the second updated state vector including new updated static state variables;
(e) creating a second conforming state vector including the new updated static state variables and the new forecast dynamic state variables; and
(f) forecasting forward from the second time step to a third tune step the second conforming state vector to compute a second forecasted conforming state vector which includes second forecast static and dynamic state variables that are in conformance with one another;
whereby the ensemble of reservoir models is further updated on the computer with the second forecasted conforming state vector which includes the second forecast static and dynamic state variables that are in conformance with one another.

* * * * *